United States Patent
Kobayashi et al.

(10) Patent No.: US 10,026,437 B2
(45) Date of Patent: Jul. 17, 2018

(54) INFORMATION PROCESSING DEVICE, INFORMATION RECORDING MEDIUM, INFORMATION PROCESSING METHOD, AND PROGRAM

(71) Applicant: SONY CORPORATION, Tokyo (JP)

(72) Inventors: Yoshiyuki Kobayashi, Tokyo (JP); Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/323,172

(22) PCT Filed: Apr. 14, 2016

(86) PCT No.: PCT/JP2016/002019
§ 371 (c)(1),
(2) Date: Dec. 30, 2016

(87) PCT Pub. No.: WO2016/189794
PCT Pub. Date: Dec. 1, 2016

(65) Prior Publication Data
US 2017/0162223 A1    Jun. 8, 2017

(30) Foreign Application Priority Data
May 22, 2015    (JP) .................................. 2015-104607

(51) Int. Cl.
*H04N 9/80*    (2006.01)
*G11B 19/12*    (2006.01)
*H04N 5/84*    (2006.01)

(52) U.S. Cl.
CPC ............. *G11B 19/122* (2013.01); *H04N 5/84* (2013.01)

(58) Field of Classification Search
CPC .................................. G11B 19/122; H04N 5/84
USPC .................................. 386/248, 239, 326, 337
See application file for complete search history.

(56) References Cited

U.S. PATENT DOCUMENTS

| | | | | |
|---|---|---|---|---|
| 2006/0153017 A1* | 7/2006 | Kim | ..................... | G11B 19/025 369/30.01 |
| 2010/0268944 A1* | 10/2010 | Ueda | ................... | G06F 21/6209 713/157 |
| 2011/0060922 A1* | 3/2011 | Sasaki | ..................... | G06F 21/10 713/194 |

* cited by examiner

*Primary Examiner* — Robert Chevalier
(74) *Attorney, Agent, or Firm* — Paratus Law Group, PLLC

(57) ABSTRACT

To determine whether or not a correct continuous reproduction disk has been attached, and perform control in accordance with a determination result in a data reproduction process including a first information recording medium and a second information recording medium. A first root certificate transform value is calculated by applying a first transform function to data constituting a first root certificate recorded in the first information recording medium and a second root certificate transform value is calculated by applying a second transform function to data constituting a second root certificate recorded in the second information recording medium. Transform values based on first and second root certificates are compared. A process under execution is continued when the first and second root certificate transform values match. However, the process under execution is stooped or a warning is output when the first and second root certificate transform values do not match.

16 Claims, 22 Drawing Sheets

FIG. 12

| | f1 | f2 | NOTE |
|---|---|---|---|
| (1) | APPLY TRANSFORM FUNCTION f1 ONCE f1(A)<br><br>(EXAMPLE)<br>APPLY HASH FUNCTION h1 ONCE f1(A) = h1(A) | APPLY TRANSFORM FUNCTION f1 TWICE f2(A) = f1(f1(A))<br><br>(EXAMPLE)<br>APPLY HASH FUNCTION h1 TWICE f2(A) = h1(h1(A)) | FOR EXAMPLE,<br>h1 = SHA-1<br>h1 = SHA-256 |
| (2) | APPLY TRANSFORM FUNCTION f1 f1(A)<br><br>(EXAMPLE)<br>APPLY HASH FUNCTION h1 f1(A) = h1(A) | APPLY TRANSFORM FUNCTION f2 (f1 ≠ f2) f2(A)<br><br>(EXAMPLE)<br>APPLY HASH FUNCTION h2 f2(A) = h2(A) | FOR EXAMPLE,<br>h1 = SHA-1<br>h1 = SHA-256 |
| (3) | APPLY TRANSFORM FUNCTION f1 f1(A)<br><br>(EXAMPLE)<br>APPLY HASH FUNCTION h1 f1(A) = h1(A) | CONNECT RESULTS OF TRANSFORM FUNCTION f1 f2(A) = f1(A)‖f1(A)<br><br>(EXAMPLE)<br>APPLY HASH FUNCTION h1 f2(A) = h1(A)‖h1(A) | FOR EXAMPLE,<br>h1 = SHA-1<br>h1 = SHA-256 |

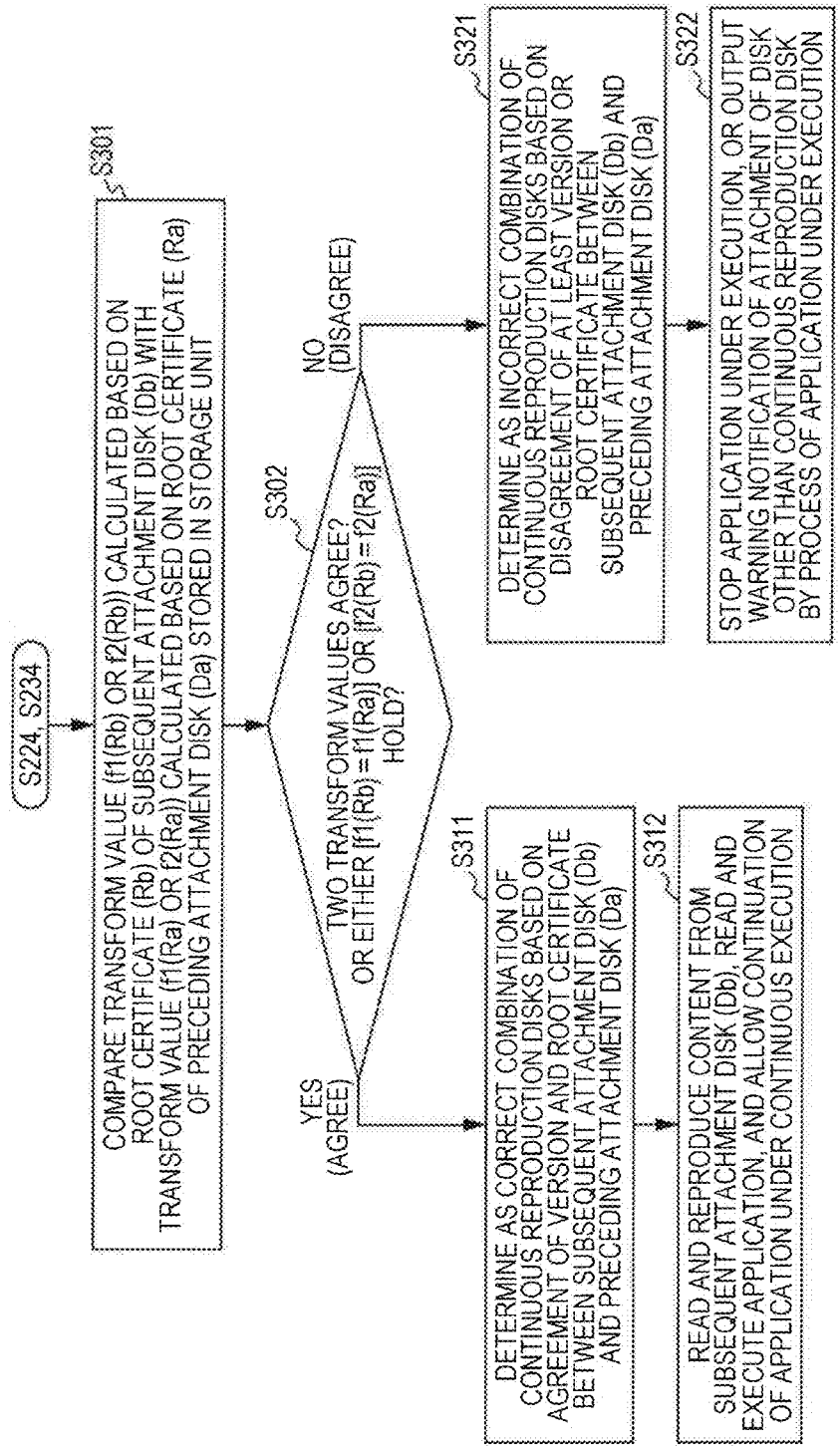

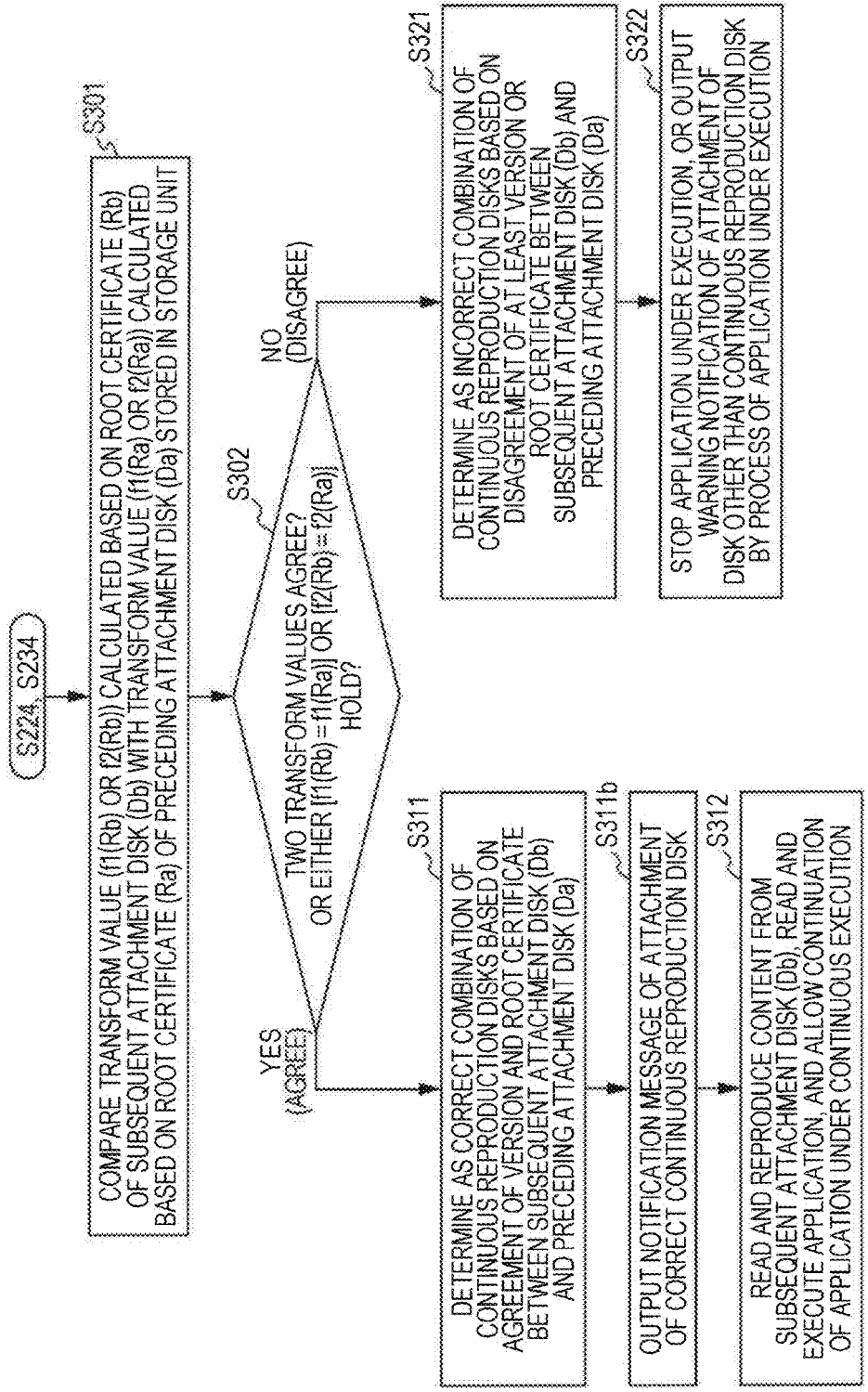

FIG. 17

| | (A) PRECEDING ATTACHMENT DISK (Da) | (B) SUBSEQUENT ATTACHMENT DISK (Db) | (C) ROOT CERTIFICATE TRANSFORM VALUE COMPARISON RESULT | (D) PROCESS |
|---|---|---|---|---|
| (1) | VERSION 1 (HD CONTENT) | VERSION 1 (HD CONTENT) | f1(Ra)=f1(Rb) | - REPRODUCE CONTENT OF SUBSEQUENT ATTACHMENT DISK<br>- CONTINUE APPLICATION |
| (2) | VERSION 1 (HD CONTENT) | VERSION 1 (HD CONTENT) | f1(Ra)≠f1(Rb) | - STOP REPRODUCTION OF CONTENT OF SUBSEQUENT ATTACHMENT DISK<br>- STOP CONTINUATION OF APPLICATION<br>(OUTPUT WARNING) |
| (3) | VERSION 1 (HD CONTENT) | VERSION 2 (UHD CONTENT) | f1(Ra)≠f2(Rb) | - STOP REPRODUCTION OF CONTENT OF SUBSEQUENT ATTACHMENT DISK<br>- STOP CONTINUATION OF APPLICATION<br>(OUTPUT WARNING) |
| (4) | VERSION 2 (UHD CONTENT) | VERSION 1 (HD CONTENT) | f2(Ra)≠f1(Rb) | - STOP REPRODUCTION OF CONTENT OF SUBSEQUENT ATTACHMENT DISK<br>- STOP CONTINUATION OF APPLICATION<br>(OUTPUT WARNING) |
| (5) | VERSION 2 (UHD CONTENT) | VERSION 2 (UHD CONTENT) | f2(Ra)=f2(Rb) | - REPRODUCE CONTENT OF SUBSEQUENT ATTACHMENT DISK<br>- CONTINUE APPLICATION |
| (6) | VERSION 2 (UHD CONTENT) | VERSION 2 (UHD CONTENT) | f2(Ra)≠f2(Rb) | - STOP REPRODUCTION OF CONTENT OF SUBSEQUENT ATTACHMENT DISK<br>- STOP CONTINUATION OF APPLICATION<br>(OUTPUT WARNING) |

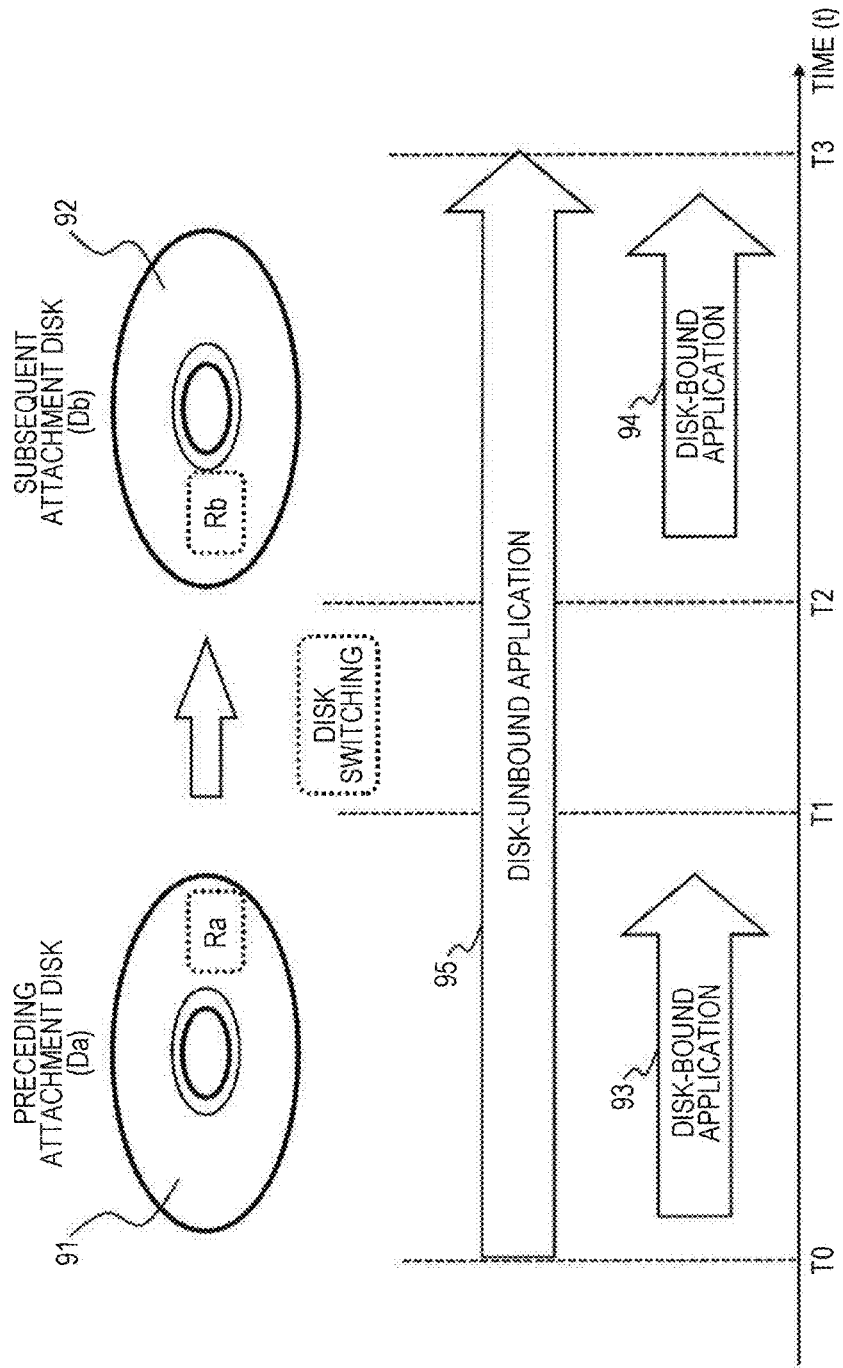

INFORMATION PROCESSING DEVICE, INFORMATION RECORDING MEDIUM, INFORMATION PROCESSING METHOD, AND PROGRAM

CROSS REFERENCE TO RELATED APPLICATIONS

This application is a National Stage Patent Application of PCT International Patent Application No. PCT/JP2016/002019 filed on Apr. 14, 2016 under 35 U.S.C. § 371, which claims the benefit of Japanese Priority Patent Application JP 2015-104607 filed May 22, 2015, the entire contents of which are incorporated herein by reference.

TECHNICAL FIELD

The present disclosure relates to an information processing device, an information recording medium, an information processing method, and a program. More specifically, the present disclosure relates to an information processing device, an information recording medium, an information processing method, and a program for executing a data reproduction process by using a plurality of different recording media.

BACKGROUND ART

Various types of software data, such as music or other audio data, movies or other image data, game programs, and various types of application programs (hereinafter collectively referred to as content) may be stored in a recording medium including a disk-type information recording medium (medium) such as a Blu-ray (registered trademark) disc and a digital versatile disc (DVD), and an information recording medium (medium) such as a flash memory.

A content storage medium is attached to a reproduction device such as a personal computer (PC) and a player possessed by a user for reproduction of content, for example.

Currently, a large number of information recording media (media) store high-definition (HD) images. A reproduction device reproduces HD images from the information recording media (media).

In recent years, the use of information recording media (media) recording ultra high definition (UHD) images, such as 4K content and 8K content, is increasing.

It is estimated that parallel use of HD image content and UHD image content continues for a while.

The HD content and the UHD content are different in their coding (codec) modes, for example. Accordingly, for reproducing and displaying UHD images, a reproduction device handling UHD and a display handling UHD need to be equipped based on the necessity of a UHD content reproduction environment different from a HD content reproduction environment.

A number of reproduction devices, displays, and other user devices widely used at present are devices handling only HD content. The number of user devices (reproduction devices and displays) capable of handling UHD content is still small. Accordingly, it is expected that content providing companies create both HD content and UHD content for identical movie content, and supply to users both information recording media such as disks for storing HD content, and information recording media such as disks for storing UHD content, for example.

On the other hand, a reproduction device in this situation needs to perform different processes for reading content from a disk storing HD content (disk of version 1) and executing reproduction, and for reading content from a disk storing UHD content (disk of version 2) and executing reproduction.

More specifically, for reproduction of HD content read from a disk storing HD content (disk of version 1), for example, the reproduction device needs to perform a decoding process adopting codec (decoding function) corresponding to the encoding mode of the HD content.

On the other hand, for reproduction of UHD content read from a disk storing UHD content (disk of version 2), the reproduction device needs to perform a decoding process adopting codec (decoding function) corresponding to the encoding mode of the UHD content.

Even for content reproduction achieved by processes other than these decoding processes, processing peculiar to respective disks of corresponding versions needs to be performed for accurate content reproduction.

Accordingly, the reproduction device initially checks the version of the disk attached to the reproduction device, and performs a reproduction process by utilizing a reproduction environment corresponding to the version.

However, a problem occurs in controlling execution of a disc-unbound application which may be utilized in a content reproduction process including disk switching.

In case of a long film, for example, movie content may be divided into two or more parts and recorded into the corresponding number of disks. For example, a disk 1 storing a first part of the movie content, and a disk 2 storing a second part of the movie content may be provided for a user. In this case, the user initially attaches the disk 1 to the reproduction device to execute a reproduction process. After completion of reproduction of storage content (first part) of the disk 1, the user removes the disk 1 and attaches the disk 2 to reproduce storage content (second part) of the disk 2.

The foregoing disc-unbound application is an application stored in the disk 1, for example. The disc-unbound application is read from the disk 1, and loaded into a RAM or the like of the reproduction device to be executed. This application is continuously executed even after removal of the disk 1 from the reproduction device to be executed after a reproduction start of the disk 2.

In other words, this application is an application executable by the reproduction device even during disk switching and after disk removal.

An application continuously executed even after removal of a disk from a reproduction device and attachment of another disk to the reproduction device, i.e., an application executable regardless of the presence or absence of disk attachment is referred to as a disc-unbound application. On the other hand, an application executed only in an attachment state of a particular disk is referred to as a disc-bound application.

These applications are described in PTL 1 (Japanese Patent No. 4919431), for example.

A disc-unbound application of a specific example outputs a message for instructing a user to switch a disk, and executes a BGM reproduction process or like processes.

For example, a disc-unbound application of this type displays a message for instructing disk switching at the time of completion of content reproduction of the disk 1, and executes BGM reproduction or advertisement content reproduction until completion of attachment of the disk 2 and a start of content reproduction of the disk 2.

In this case, however, such a situation may occur, for example, that a user erroneously attaches a disk of a version (disk of version 2 storing UHD content) different from the version of the reproduction completed disk (such as disk of version 1 storing HD content) at the time of disk switching.

In this case, the user may reproduce low image quality content different from image quality intended by the user, or cause reproduction errors without recognizing attachment of the disk of the different version, when the foregoing disc-unbound application is continuously executed.

CITATION LIST

Patent Literature

[PTL 1]
Japanese Patent No. 3959735

SUMMARY

Technical Problem

The present disclosure has been developed in consideration of the aforementioned problems, for example. It is desirable of the present disclosure to provide an information processing device, an information recording medium, an information processing method, and a program for allowing a user to recognize attachment of an incorrect disk, and for urging the user to perform disk switching when a disk different from a correct continuous reproduction disk, such as a subsequent disk of a version different from the version of a previous disk, is attached at the time of switching of a plurality of disks intended to be continuously reproduced.

More specifically, it is desirable of the present disclosure to provide an information processing device, an information recording medium, an information processing method, and a program executing a stop process for stopping a disc-unbound application under execution, or a process for notifying a user of attachment of an incorrect disk at the time of disk switching.

Solution to Problem

A first aspect of the present disclosure is directed to an information processing device including circuitry configured to control a data reproduction process for a first information recording medium and a second information recording medium, calculate a first root certificate transform value by applying a first transform function to data constituting a first root certificate recorded in the first information recording medium, calculate a second root certificate transform value by applying a second transform function to data constituting a second root certificate recorded in the second information recording medium, compare the first root certificate transform value and the second root certificate transform value, and based on a result of the comparison, continue a process under execution when the first and second root certificate transform values match, and stop the process under execution or output a warning when the first and second root certificate transform values do not match.

A second aspect of the present disclosure is directed to an information recording medium that records content corresponding to a reproduction target of an information processing device; a root certificate corresponding to a public key certificate storing a public key of a content owner of the content; and an application executable by the information processing device even after removal of the information recording medium from the information processing device, wherein the application controls the information processing device to output a warning when a subsequent attachment information recording medium attached to the information processing device after removal of the information recording medium is not a correct continuous subsequent attachment information recording medium.

A third aspect of the present disclosure is directed to an information processing method, the method including controlling a data reproduction process for a first information recording medium and a second information recording medium, calculating a first root certificate transform value by applying a transform function to data constituting a first root certificate recorded in the first information recording medium, calculating a second root certificate transform by applying a transform function to data constituting a second root certificate recorded in the second information recording medium, comparing the first root certificate transform value and the second root certificate transform value, and based on a result of the comparison, continuing a process under execution when the first and second root certificate transform values match, and stopping the process under execution or outputting a warning when the first and second root certificate transform values do not match.

A fourth aspect of the present disclosure is directed to a non-transitory computer-readable storage medium having embodied thereon a program, which when executed by at least one processor of an information processing device causes the information processing device to execute an information processing method, the method including controlling a data reproduction process for a first information recording medium and a second information recording medium, calculating a first root certificate transform value by applying a transform function to data constituting a first root certificate recorded in the first information recording medium, calculating a second root certificate transform value by applying a transform function to data constituting a second root certificate recorded in the second information recording medium, comparing the first root certificate transform value and the second root certificate transform value, and based on a result of the comparison, continuing a process under execution when the first and second root certificate transform values match, and stopping the process under execution or outputting a warning when the first and second root certificate transform values do not match.

The program according to an embodiment of the present disclosure is a program for an information processing device or a computer system capable of executing various program codes, provided via a storage medium or a communication medium in a form readable by a computer, for example. Under the program provided in the form readable by a computer, processes corresponding to the program are realized by the information processing device or the computer system.

Other objects, features, and advantages of the present disclosure will become apparent by further detailed description based on an embodiment of the present disclosure and the accompanying drawings described and depicted below. The system in the present specification refers to a logical collective configuration constituted by a plurality of devices, and includes a set of constituent devices not contained in an identical housing.

Advantageous Effects of Invention

A configuration according to an embodiment of the present disclosure is capable of determining whether or not a correct continuous reproduction disk has been attached, and performing control in accordance with a determination result in a data reproduction process including disk switching.

More specifically, a transform value is calculated based on data constituting a root certificate recorded in an information recording medium to execute a data reproduction process including switching of the information recording medium. For example, root certificate transform values are calculated by applying different transform functions in accordance with disk versions of a HD disk and a UHD disk. Transform values based on root certificates read from a preceding attachment disk and a subsequent attachment disk are compared. An application under execution is continued when the transform values match. However, the application under execution is stopped or a warning is output when the transform values do not match.

This configuration is capable of determining whether or not a correct continuous reproduction disk has been attached, and performing control in accordance with a determination result in a data reproduction process including disk switching. Advantageous effects described in this specification are presented only by way of example, wherefore other advantageous effects or additional advantageous effects may be offered.

BRIEF DESCRIPTION OF DRAWINGS

FIG. 12 is a view showing an example of transform functions.

FIG. 15 is a flowchart showing a processing sequence executed by the reproduction device according to an embodiment of the present disclosure.

FIG. 16 is a flowchart showing a processing sequence executed by the reproduction device according to an embodiment of the present disclosure.

FIG. 17 is a view showing a table which lists up processes executed by the reproduction device according to an embodiment of the present disclosure in accordance with comparison results of transform values based on disk versions and root certificates.

FIG. 18 is a view showing an example of an application control process executed by the reproduction device according to an embodiment of the present disclosure.

DESCRIPTION OF EMBODIMENTS

Figure 1:
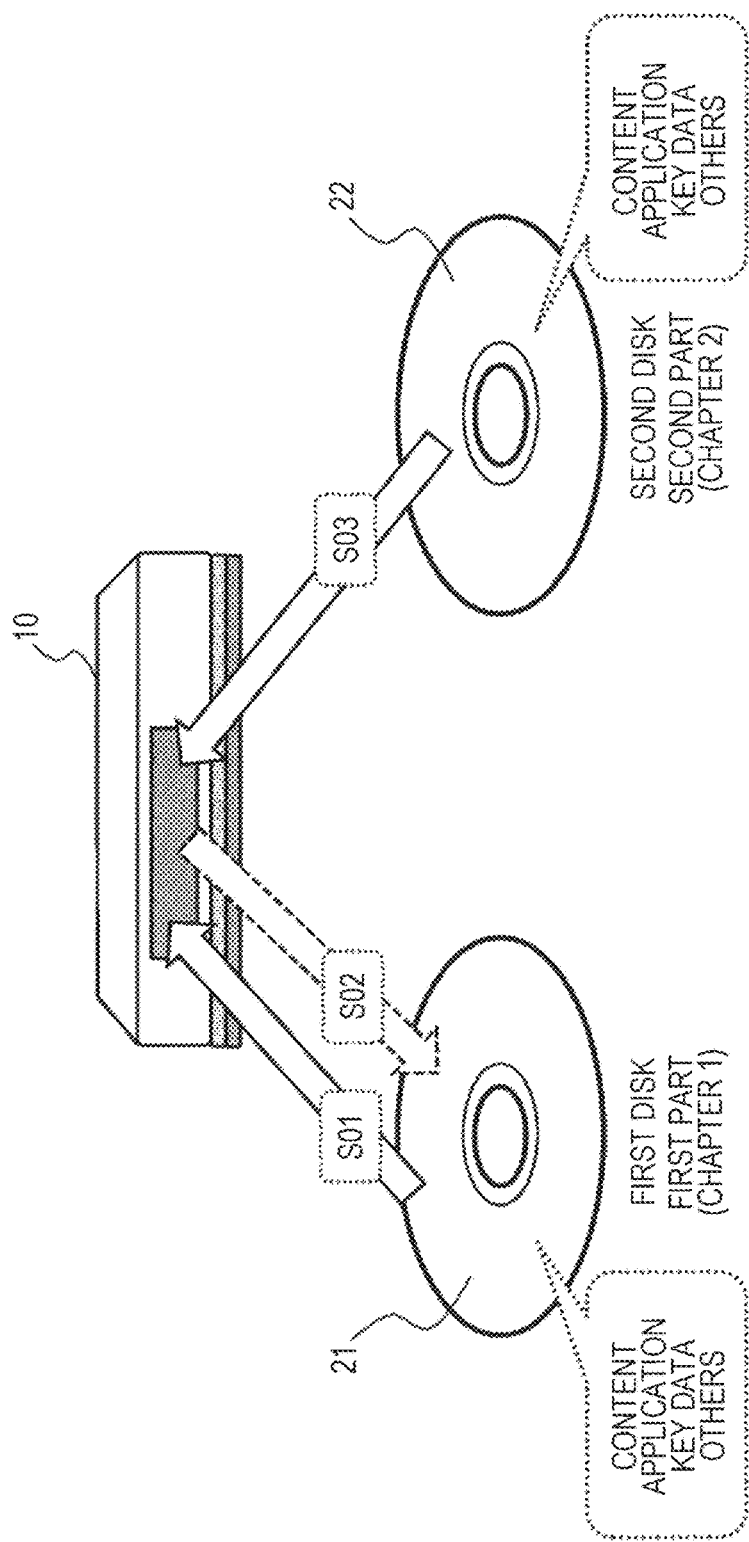
FIG. 1 is a view illustrating an example of a content reproduction process including disk switching.

Details of an information processing device, an information recording medium, an information processing method, and a program according to an embodiment of the present disclosure are hereinafter described with reference to the drawings. The description is presented based on the following items.

1. Content reproduction process including disk switching, and application execution examples
2. Problems of content reproduction process including disk switching
3. Embodiment allowing correct content reproduction including disk switching and application execution
4. Other examples of application execution control
5. Reproduction process using data stored in local storage unit
6. Hardware configuration example of information processing device
7. Summary of configuration of present disclosure 1. Content Reproduction Process Including Disk Switching, and Application Execution Examples Initially, a content reproduction process including disk switching, and application execution examples are hereinafter described.

FIG. 1 illustrates a reproduction device 10 which executes a content reproduction process including disk switching, and two disks 21 and 22.

The disks 21 and 22 are Blu-ray (registered trademark) discs, for example. Discussed in the following embodiment is an example using Blu-ray (registered trademark) discs corresponding to information recording media. However, processes according to an embodiment of the present disclosure are applicable to other types of disks, or configurations utilizing different type s of information recording media other than disks.

The first disk 21 and the second disk 22 illustrated in FIG. 1 store a first part (chapter 1) and a second part (chapter 2) of a movie, respectively, for example.

In step S01, the reproduction device 10 illustrated in FIG. 1 initially reproduces content stored in the first disk 21, i.e., the first part (chapter 1) of the movie, after attachment of the first disk 21 corresponding to a preceding attachment disk.

Reproduced images and voices are output via an output device containing a display and a speaker, such as a television set, connected to the reproduction device 10.

After completion of reproduction of the first part (chapter 1) of the movie corresponding to the content stored in the first disk 21, a user removes the first disk 21 from the reproduction device 10 in step S02.

In step S03, the user attaches the second disk 22 corresponding to a subsequent attachment disk to the reproduction device 10 to reproduce content stored in the second disk 22, i.e., the second part (chapter 2) of the movie.

While two disks are used in the example illustrated in FIG. 1, three or more disks may be used while sequentially switched. When a plurality of disks are sequentially switched for data reproduction, a disk switching period is produced.

For example, an application (program) read from the first disk 21 is executed to output images and voices to the output device such as a television set connected to the reproduction device 10 during the disk switching period.

The application read from the first disk 21 may be stored in a storage unit, such as a RAM, of the reproduction device 10, and executed even after removal of the first disk 21.

This type of disk recording application executable even in a disk non-attachment state is referred to as a disc-unbound application.

On the other hand, an application executed only in an attachment state of a particular disk is referred to as a disc-bound application.

A specific example of the disc-unbound application outputs a message for instructing a user to switch a disk, and performs a BGM reproduction process and like processes.

Figure 2:
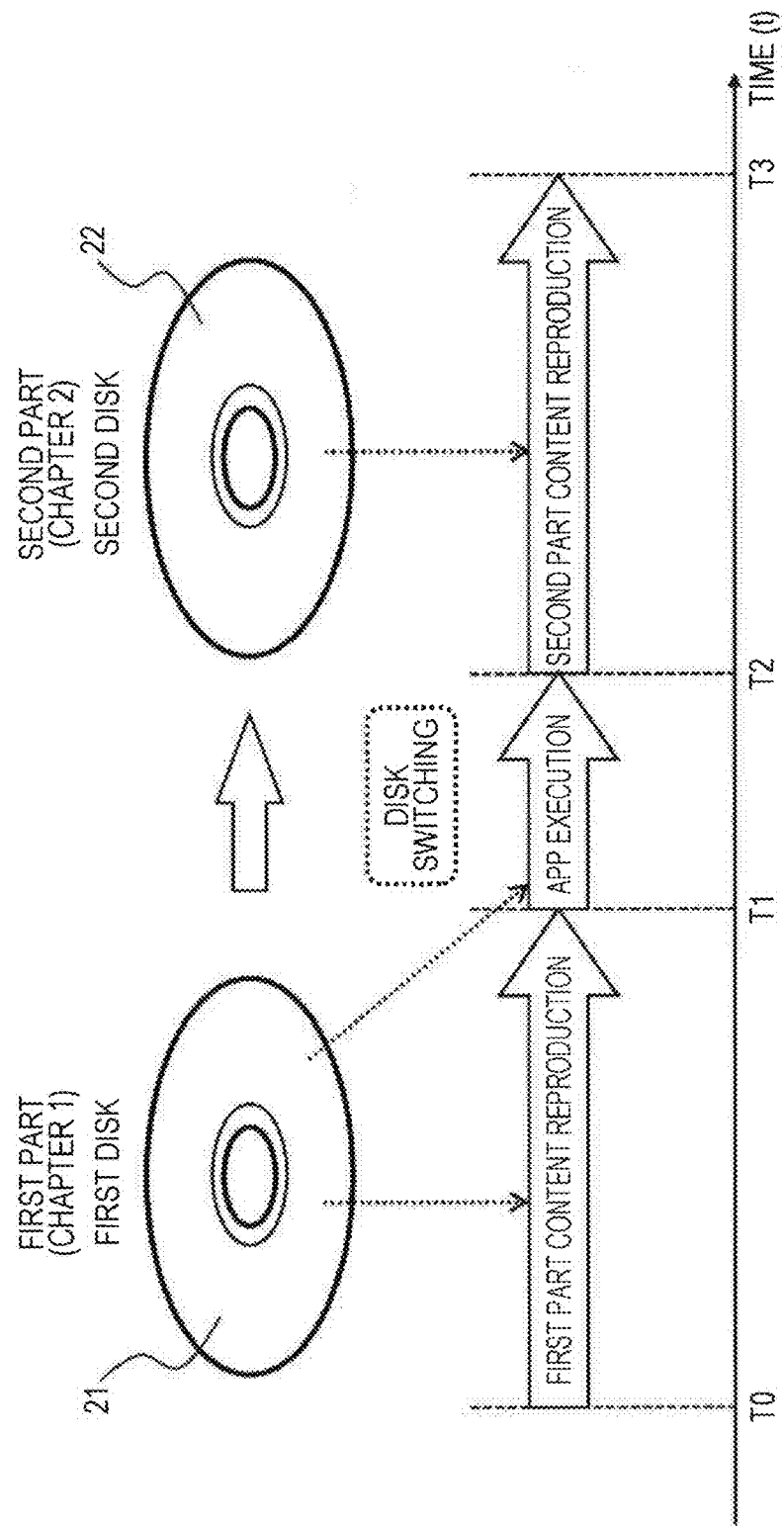
FIG. 2 is a view illustrating an application execution example of the content reproduction process including disk switching.

An execution example of the disc-unbound application is hereinafter described with reference to FIG. 2. FIG. 2 illustrates the two disks 21 and 22 described with reference to FIG. 1.

The first disk 21 and the second disk 22 store a first part (chapter 1) and a second part (chapter 2) of a movie, respectively, for example.

FIG. 2 further defines a time axis (t) to show a content reproduction process and an application execution sequence on the basis of the time axis.

A period from a time T0 to a time T1 is a period for attaching the first disk 21, and reproducing the content stored in the first disk 21, i.e., the first part (chapter 1) of the movie. After completion of reproduction of the first part (chapter 1) of the movie corresponding to the content stored in the first disk 21 at the time T1, the user removes the first disk 21 from the reproduction device 10.

At a time T2, the user attaches the second disk 22 to the reproduction device 10 to reproduce the content stored in the second disk 22, i.e., the second part (chapter 2) of the movie. A period from the time T2 to a time T3 is a period for reproducing the content stored in the second disk 22, i.e., the second part (chapter 2) of the movie.

The period from the time to the time T2 corresponds to a disk switching period. During the period from the time T1 to the time T2, the application (program) read from the first disk 21 is executed to output images and voices to the output device, such as a television set, connected to the reproduction device 10.

The application read from the first disk 21 is the foregoing disc-unbound application stored in the storage unit, such as a RAM, of the reproduction device 10, and may be executed even after removal of the first disk 21.

According to the example illustrated in FIG. 2, the application execution period is limited to the disk non-attachment period. However, the application execution period is not limited to this period presented by way of example, but may be set to various periods. For example, the application may be executed in parallel with content reproduction.

Figure 3:
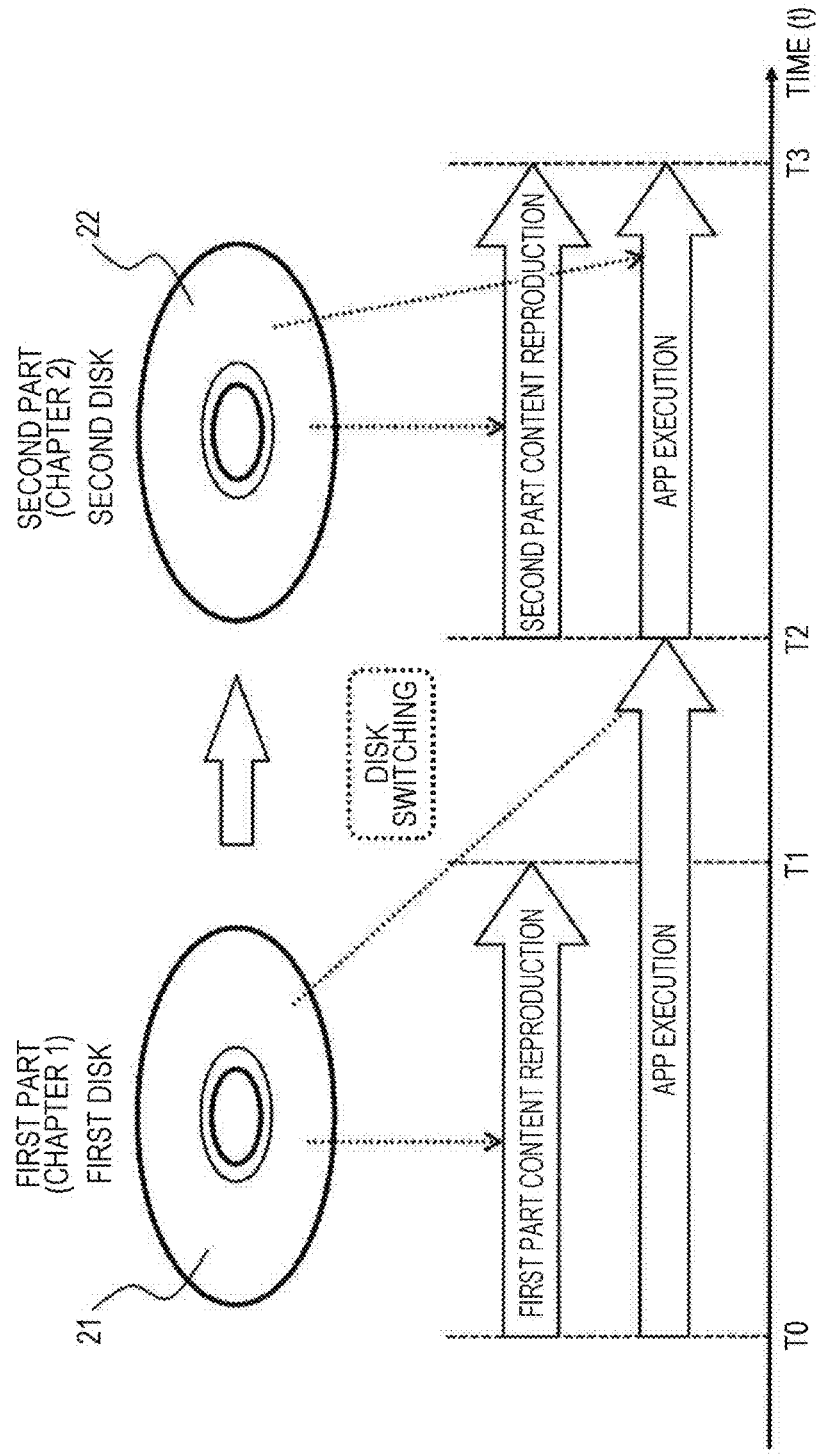
FIG. 3 is a view illustrating an application execution example of the content reproduction process including disk switching.
Figure 4:
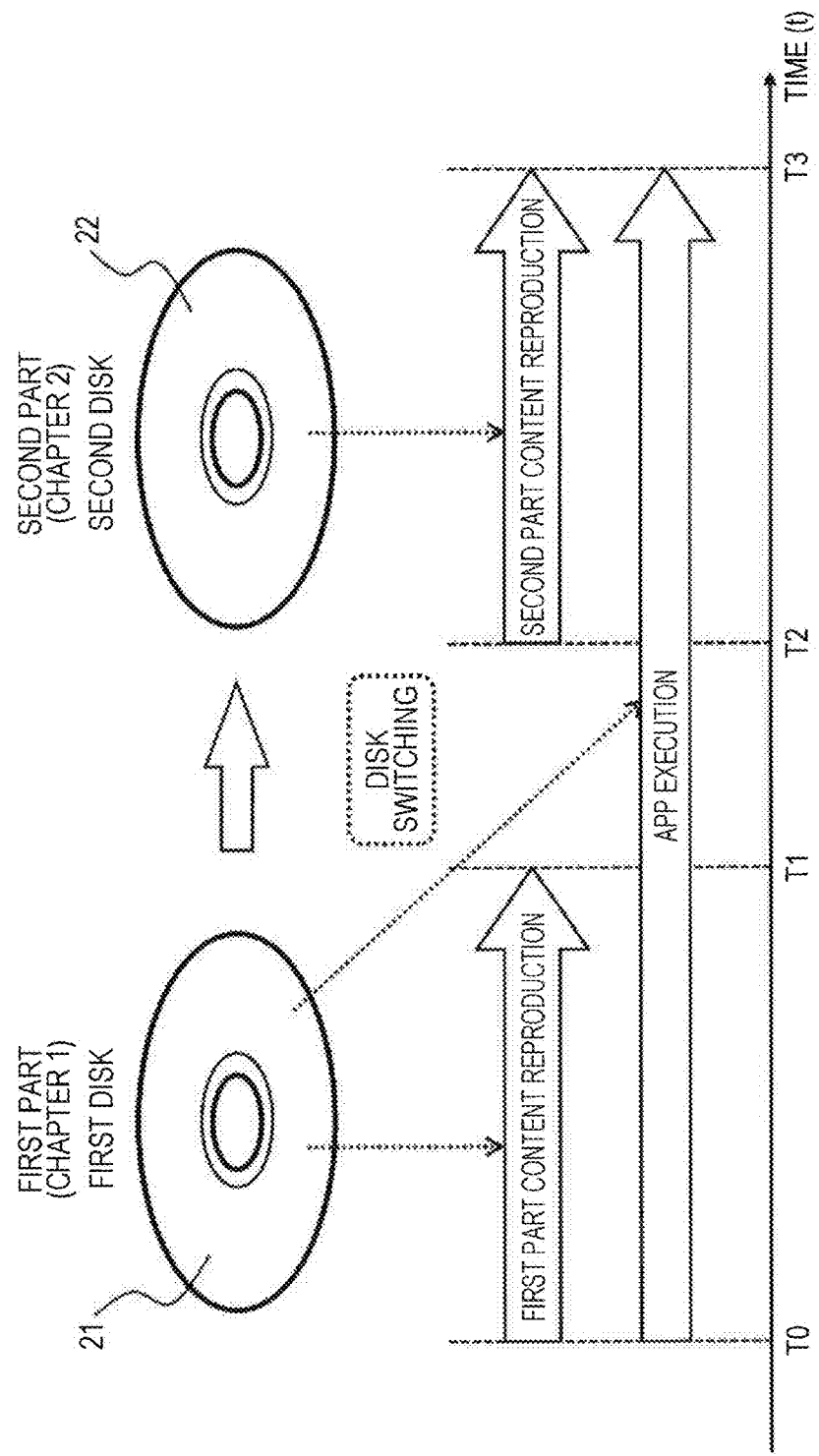
FIG. 4 is a view illustrating an application execution example of the content reproduction process including disk switching.
Figure 5:
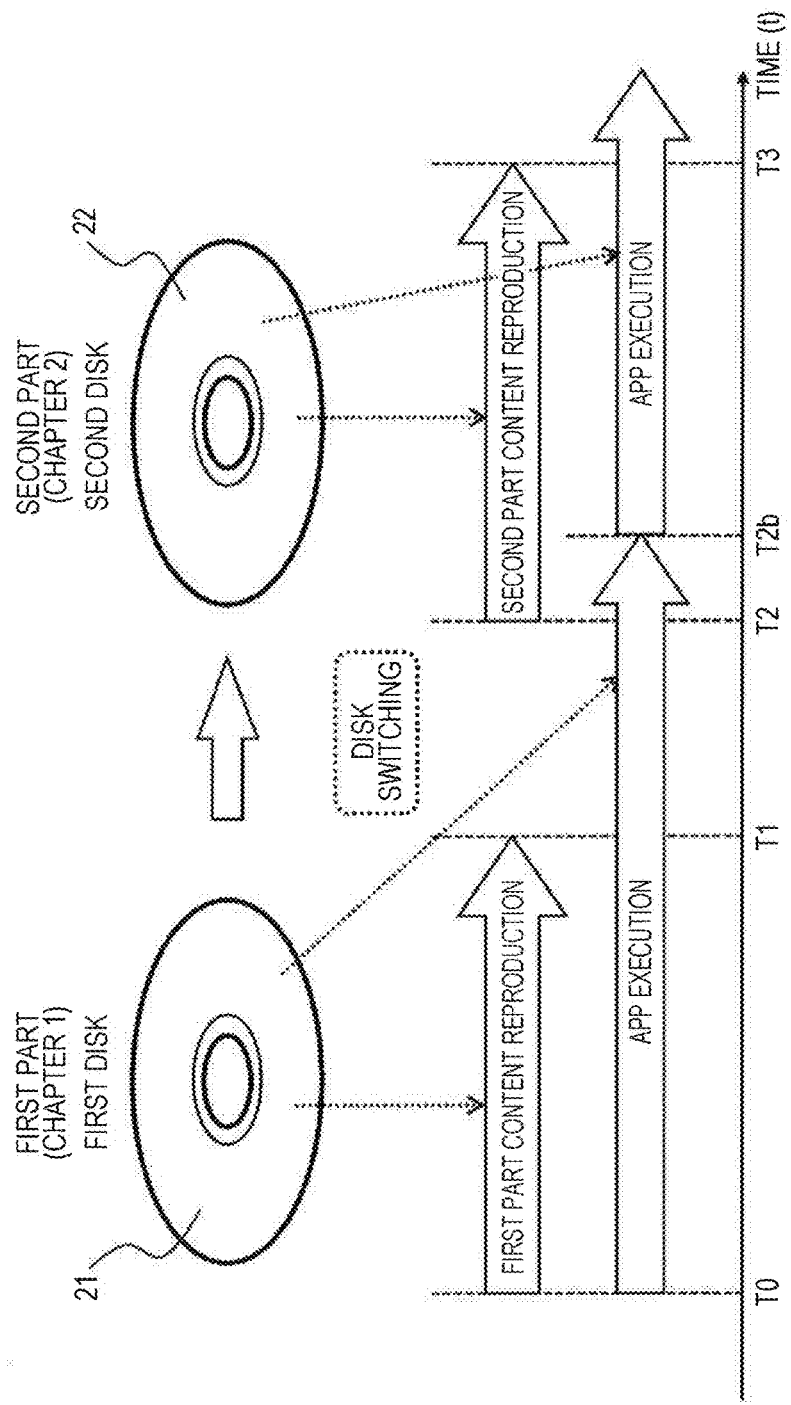
FIG. 5 is a view illustrating an application execution example of the content reproduction process including disk switching.

More specifically, the application may be executed as examples illustrated in FIGS. 3 through 5.

Discussed initially is the application execution example illustrated in FIG. 3.

According to the example illustrated in FIG. 3, an application read from the first disk 21 is stored in the storage unit of the reproduction device 10, and executed along with content reproduction read from the first disk.

The application is continuously executed even after completion of content reproduction of the first disk 21 and removal of the first disk 21 from the reproduction device 10. The application is executed until the time T2 corresponding to the start of content reproduction from the second disk after completion of attachment of the second disk 22. After the time T2, an application read from the second disk 22 is executed in parallel with reproduction of recorded content of the second disk.

An example of applications applicable to this type is an application which outputs advertisement content to a part of a screen along with reproduction of movie content. This type of application is executed in parallel with a content reproduction process from a disk. A data output process for outputting data such as advertisement performed by this type of application is continuously executed even during the disk non-attachment period.

The application execution example illustrated in FIG. 4 is now described.

Discussed in FIG. 4 is an example which executes an application read from the first disk 21 throughout periods of a content reproduction period of the first disk 21 (T0 to T1), a disk switching period (T1 to T2), and a content reproduction period of the second disk 22 (T2 to T3).

The application read from the first disk 21 is stored in the storage unit of the reproduction device 10, and continuously executed from the content reproduction start (T0) of the first disk 21 to the content reproduction end (T3) of the second disk 22.

This structure eliminates the necessity of recording an application program in the second disk 22.

The application execution example illustrated in FIG. 5 is now described.

According to the example illustrated in FIG. 5, an application read from the first disk 21 is stored in the storage unit of the reproduction device 10, and executed in parallel with content reproduction read from the first disk.

The application is continuously executed even after completion of content reproduction of the first disk 21 and removal of the first disk 21 from the reproduction device 10, until a time T2b after attachment of the second disk 22. Executed after the time T2b is an application read from the second disk 22 and stored in the storage unit of the reproduction device 10.

As described above, various settings are allowed for the execution sequence of the application.

The application executed during the period of disk switching (T1 to T2) is the application read from the first disk 21. After attachment of the second disk 22 to the reproduction device 10, either the application read from the first disk 21, or the application read from the second disk 22 is executed.

After attachment of the second disk 22 to the reproduction device 10, the reproduction device 10 is capable of reading the application program recorded in the second disk, storing the application program in the storage unit of the reproduction device 10, and switching the application to be executed from the application read from the first disk 21 to the application read from the second disk 22 at arbitrary timing.

As described above, an application recorded in each disk is retained in the storage unit of the reproduction on device and executed. Accordingly, the application is continuously executed independently from attachment or detachment of the disk.

This process allows output of images and voices to the output device such as a television set without a break even in case of content reproduction including switching of a plurality of disks.

2. Problems of Content Reproduction Process Including Disk Switching

Problems caused in the content reproduction process including disk switching are hereinafter described with reference to FIG. 6 and figures after FIG. 6.

Such a situation may occur, for example, that the user erroneously attaches a disk of a version (disk of version 2 storing UHD content) different from the version of a reproduction completion disk (such as disk of version 1 storing HD content) at the time of disk switching.

This situation may cause a problem that the user reproduces content recorded in the newly attachment disk and as content of image quality different from image quality of the first part without recognizing the erroneous attachment of the disk of the different version when the foregoing application (disc-unbound application) is continuously executed. Alternatively, this situation may cause reproduction errors.

Currently, high definition (HD) images are recorded in a number of disks. The reproduction device 10 reproduces HD images when a recording disk containing HD images is attached to the reproduction device 10.

In recent years, however, the use of disks recording ultra-high definition (UHD) images, such as 4K content and 8K content, is increasing.

It is estimated that parallel use of HO image content and UHD image content continues for a while.

The HD content and the UHD content are different in their coding (codec) mode, for example. For reproducing and displaying UHD images, it is necessary to provide a reproduction environment for handling UHD different from a reproduction environment of HD content. In other words, a reproduction device handling UHD, and a display handing UHD need to be equipped.

It is expected that a number of next generation type reproduction devices capable of reproducing UHD content are configured to reproduce both the HD content and UHD content. However, reproduction devices currently available are capable of reproducing only HD content, and not allowed to reproduce UHD content.

In the situation that there exist both conventional reproduction devices capable of only reproducing HD content, and new model reproduction devices capable of reproducing both HD content and UHD content, problems such as low-quality image reproduction may be caused when the user does not recognize reproduction errors, or changes of image quality of reproduction content. Specific problems caused in the reproduction process are hereinafter described with reference to FIG. 6 and the figures after FIG. 6.

Figure 6:
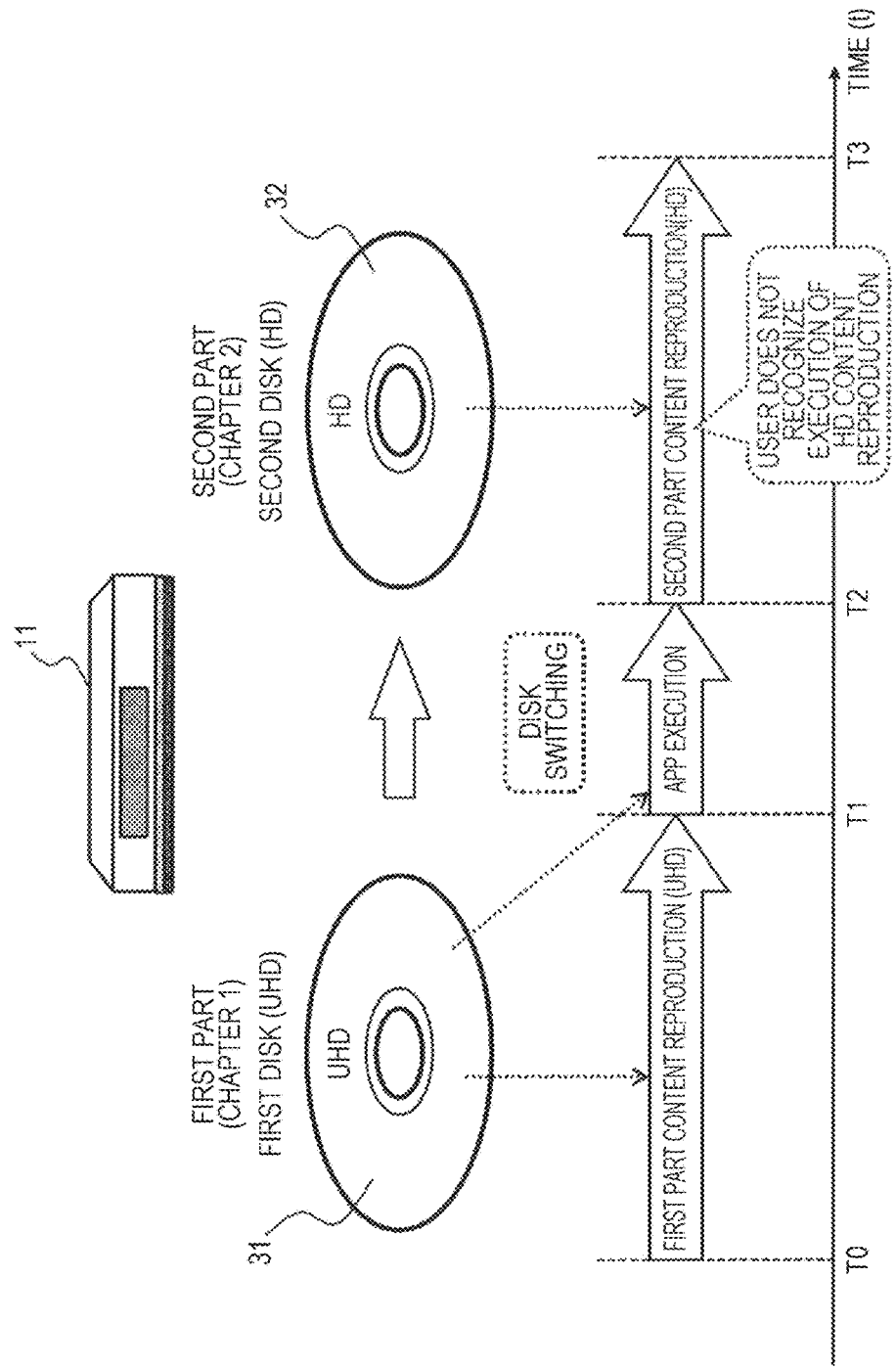
FIG. 6 is a view illustrating an example of problems caused in the content reproduction process including disk switching.

FIG. 6 illustrates an example of a latest model reproduction device 11 capable of reproducing both HD content and UHD content.

Two disks 31 and 32 are illustrated in FIG. 6.

The first disk 31 and the second disk 32 store a first part (chapter 1) and a second part (chapter 2) of a movie, respectively, for example.

The first disk 31 is the UHD disk 31 which records ultra high definition (UHD) images such as 4K content and 8K content, while the second disk 32 is the HD disk 32 which records conventional 2K (HD) images.

It is assumed, for example, that the user possesses both a pair of UHD disks, and a pair of HD disks mixed with one another.

The user prepares two disks with an intention for reproducing the pair of UHD disks, but does not recognize at all that the second disk 32 corresponding to the second part (chapter 2) is a disk recording HD content.

The user initially attaches the first disk (UHD) 31 to the reproduction device 11, and starts content reproduction from a time T0.

In the period from the time T0 to a time T1, UHD content stored in the first disk (UHD) 31, i.e., UHD content constituting the first part (chapter 1) of the movie is reproduced. At the time T1, the user removes the first disk (UHD) 31 from the reproduction device 11 after completion of reproduction of the first part (chapter 1) of the movie corresponding to the UHD content stored in the first disk (UHD) 31, and then attaches the second disk (HD) 32 to the reproduction device 11.

The second disk (HD) 32 attached by the user to the reproduction device 11 is a HD disk storing HD content. However, the user misunderstands that the attachment disk is a UHD disk storing UHD content.

In a period from a time T2 to a time T3, content stored in the second disk (HD) 32, i.e., HD content constituting the second part (chapter 2) of the movie is reproduced.

The reproduction device 11 is a new model reproduction device capable of reproducing both HD content and UHD content, and performs a reproduction process while recognizing whether the disk storage content is HD content or UHD content. Accordingly, the reproduction process is correctly performed.

However, the user does not recognize that the content reproduced from the second disk (MD) 32 in the period from the time T2 to the time T3 is not UHD content but HD content. Accordingly, the user continues viewing of content while misunderstanding that the low image quality HD content is the UHD content.

The period from the time T1 to the time T2 illustrated in FIG. 6 is a disk switching period. During the period from the time T1 to the time T2, images and voices under output control by an application (program) read from the first disk (UHD) 21 are output to the output device, such as a television set, connected to the reproduction device 11.

The application read from the first disk 21 is an application stored in the storage unit, such as a RAM, of the reproduction device 10, and executed even after removal of the first disk 21.

In other words, this application is a disc-unbound application discussed above.

As described above with reference to FIGS. 2 through 5, various settings are allowed for execution timing of the application. For example, the application read from the preceding attachment disk (first disk) may be continuously executed even after attachment of the subsequent attachment disk (second disk) as described with reference to FIGS. 4 and 5.

According to this application execution mode, reproduction errors of the content or the application may be further caused.

This problem is now described with reference to FIG. 7.

Figure 7:
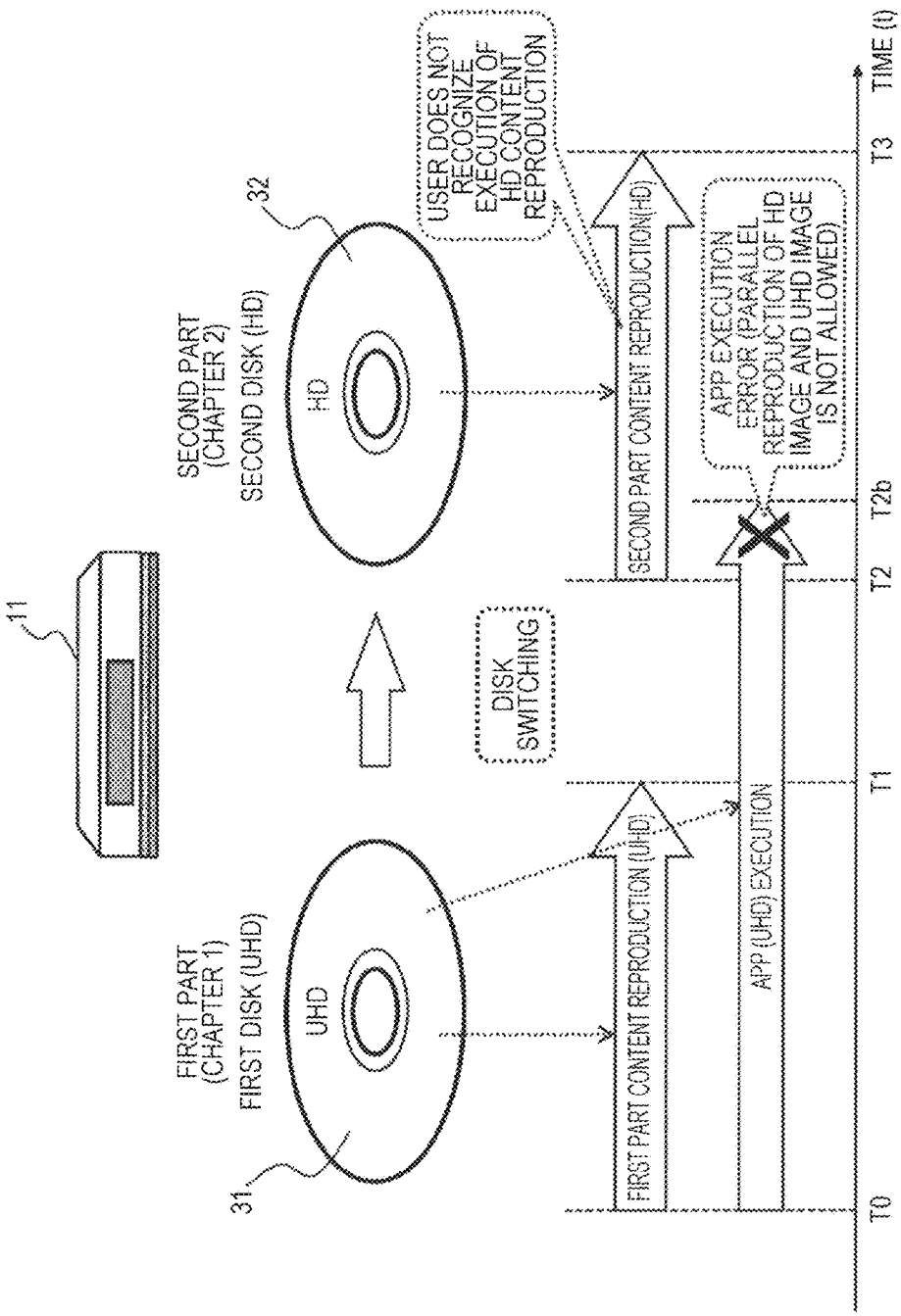
FIG. 7 is a view illustrating an example of problems caused in the content reproduction process including disk switching.

The reproduction device 11 illustrated in FIG. 7 is the latest model reproduction device 11 capable of reproducing both HD content and UHD content similarly to the example illustrated in FIG. 6.

The two disks 31 and 32 are illustrated in FIG. 7. The first disk 31 and the second disk 32 store a first part (chapter 1) and a second part (chapter 2) of a movie, respectively, for example.

However, each of these two disks stores image content of different image quality to the example described with reference to FIG. 6.

The first disk 31 is the UHD disk 31 which records ultra high definition (UHD) images, such as 4K content or 8K content, while the second disk 32 is the HD disk 32 which records conventional 2K (HD) images.

The user initially attaches the first disk (UHD) 31 to the reproduction device 11, and starts content reproduction from a time T0.

In the period from the time T0 to a time T1, UHD content stored in the first disk (UHD) 31, i.e., UHD content constituting the first part (chapter 1) of the movie is reproduced. At the time T1, the user removes the first disk (UHD) 31 from the reproduction device 11 after completion of reproduction of the first part (chapter 1) of the movie corresponding to the UHD content stored in the first disk (UHD) 31, and then attaches the second disk (HD) 32 to the reproduction device 11.

The second disk (HD) 32 attached by the user to the reproduction device 11 is a HD disk storing HD content. However, the user misunderstands that the attachment disk is a UHD disk storing UHD content.

In a period from a time T2 to a time T3, content stored in the second disk (HD) 32, i.e., HD content constituting the second part (chapter 2) of the movie is reproduced.

The reproduction device 11 is a now model reproduction device capable of reproducing both HD content and UHD content, and performing a reproduction process while recognizing whether the disk storage content is HD content or UHD content. Accordingly, the reproduction process for HD content is correctly performed.

More specifically, the reproduction device 11 finishes a reproduction environment for UHD content previously offered, establishes a reproduction environment for HD content, and starts processing for reproducing HD content in a normal condition by using codec or the like corresponding to HD content.

When the application program read from the UHD disk is a reproduction application for UHD image content, however, reproduction errors are caused under the reproduction environment for HD established by the reproduction device 11. This problem is caused by the configuration of the reproduction device 11 not allowed to execute the reproduction processes in parallel for both HD content and UHD content. More specifically, while reproducing HD content by adopting the reproduction environment for HD content, the reproduction device 11 is not allowed to execute reproduction of the application for reproduction of UHD image content.

Accordingly, the application intended to be executed in parallel with content reproduction causes reproduction errors.

A problem caused in case of an old type reproduction device not handling UHD content but reproducing only HD content is hereinafter described with reference to FIG. 8.

Figure 8:
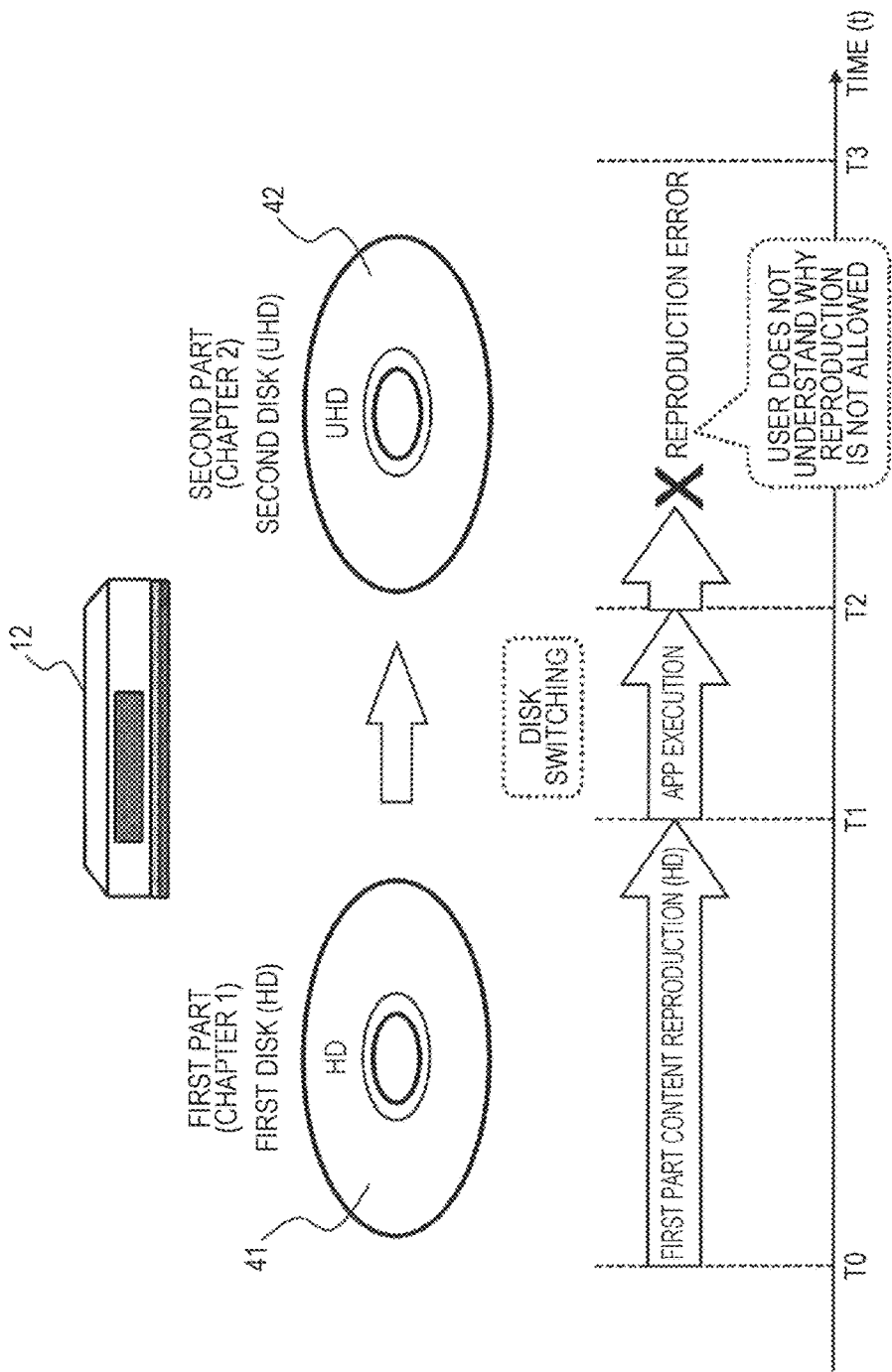
FIG. 8 is a view illustrating an example of problems caused in the content reproduction process including disk switching.

A reproduction device 12 illustrated in FIG. 8 is an old type reproduction device 12 capable of reproducing only HD content, but not reproducing UHD content, unlike the examples described with reference to FIGS. 6 and 7.

Two disks 41 and 42 are illustrated in FIG. 8.

The first disk 41 and the second disk 42 store a first part (chapter 1) and a second part (chapter 2) of a movie, respectively, for example.

The first disk 41 is the HD disk 41 recording conventional 2K (HD) images, while the second disk 42 is the UHD disk 42 recording ultra high definition (UHD) images, such as 4K content and 8K content.

The user initially attaches the first disk (HD) 41 to the reproduction device 12, and starts content reproduction from a time T0.

In a period from the time T0 to a time T1, HD content stored in the first disk (HD) 41, i.e., HD content constituting the first part (chapter 1) of the movie is reproduced.

At the time T1, the user removes the first disk (HD) 41 from the reproduction device 12 after completion of reproduction of the first part (chapter 1) of the movie corresponding to HD content stored in the first disk (HD) 41, and then attaches the second disk (UHD) 42 to the reproduction device 12.

The second disk (UHD) 42 attached by the user to the reproduction device 12 is a UHD disk storing UHD content. However, the user attaches this disk without recognizing that the UHD disk storing UHD content has been attached.

The reproduction device 12 is a reproduction device exclusively used for HD content and not capable of reproducing UHD content. Accordingly, the reproduction device 12 executes processing on the assumption that the attached second disk 42 is a HD content storing disk.

The reproduction device 12 does not include codec or the like handling UHD. Accordingly, the reproduction device 12 tries to reproduce content read from the second disk 42 while continuing the reproduction environment corresponding to HD without change.

In this case, however, codec or the like handling UHD is not used, wherefore reproduction errors are produced as a result of a failure to perform correct content reproduction from the second disk 42.

As described with reference to FIGS. 6 through 8, various problems may be caused by sequential attachment of disks each of which records content requiring a different reproduction environment, such as HD content or UHD content, in the reproduction process including sequential switching of a plurality of disks.

3. Embodiment Allowing Correct Content Reproduction Including Disk Switching and Execution of Application Discussed hereinbelow is an embodiment which correctly performs content reproduction including disk switching and execution of an application.

A basic sequence performed in a content reproduction process including disk switching by the reproduction device according to an embodiment of the present disclosure is described with reference to FIG. 9.

It is assumed in the following description that an information recording medium (disk) storing HD content is an information recording medium of version 1 (disk), and that art information recording medium (disk) storing UHD content is an information recording medium of version 2 (disk).

When a disk is newly attached to the reproduction device, the reproduction device initially reads version information recorded in the disk, and determines whether the content recorded in the attachment disk is HD content or UHD content.

Figure 9:
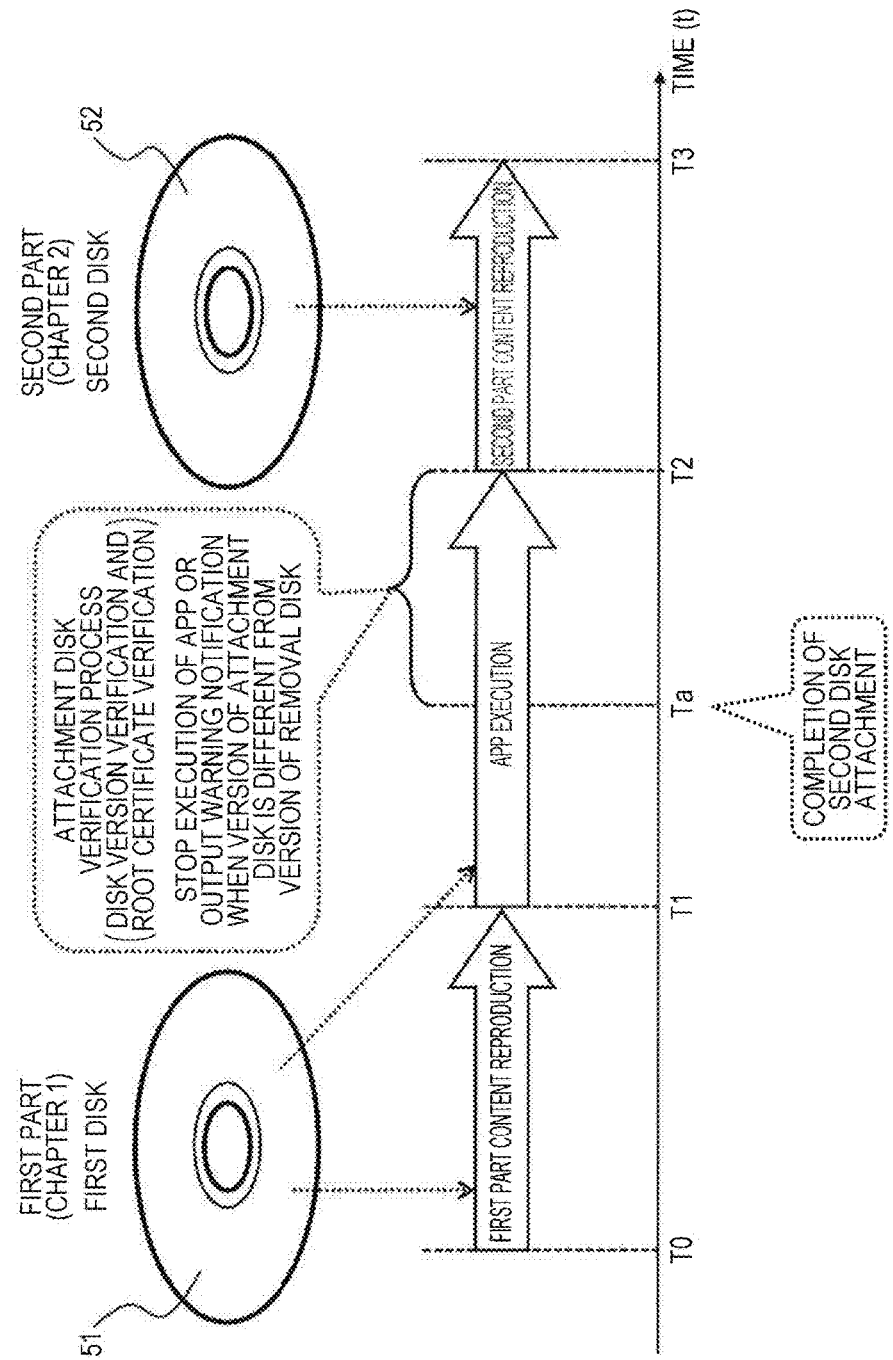
FIG. 9 is a view illustrating an example of problems caused in the content reproduction process including disk switching.

Two disks 51 and 52 are illustrated in FIG. 9.

The first disk 51 and the second disk 52 store a first part (chapter 1) and a second part (chapter 2) of a movie, respectively, for example.

A combination of versions of the first disk 51 and the second disk 52 is selected from the following four combinations.

(1) First disk 51=version 1 (HD), second disk 52=version 1 (HD)
(2) First disk 51=version 1 (UHD), second disk 52=version 2 (UHD)
(3) First disk 51=version 2 (UHD), second disk 52=version 1 (HD)
(4) First disk 51=version 2 (UHD), second disk 52=version 2 (UHD)

The user initially attaches the first disk 51 to the reproduction device, and starts content reproduction at a time T0.

In a period from the time T0 to a time T1, content stored in the first disk 51, i.e., a first part (chapter 1) of a movie, for example, is reproduced.

At the time T1, the user removes the first disk 51 from the reproduction device after completion of reproduction of the first part (chapter 1) of the movie corresponding to the content stored in the first disk 51, and then attaches the second disk 52 to the reproduction device.

It is assumed that a time Ta is a time when the second disk is attached to the reproduction device.

After completion of reproduction of the first part (chapter 1) of the movie corresponding to the content stored in the first disk 51, an application read from the first disk 51 (disc-unbound application) is executed.

As described above, various settings are allowed for the execution period of the application. According to the example illustrated in FIG. 9, the execution period of the application continues from the end time (T1) of content reproduction from the first disk 51 to the start time (T2) of content reproduction from the second disk 52.

After attachment of a disk to the reproduction device, the reproduction device reads a root certificate recorded in the attachment disk, and executes a verification process for verifying the root certificate.

The root certificate is a public key certificate recorded in the disk together with content.

The root certificate is a public key certificate storing a public key of a content owner such as a content creator or a content manager of content recorded in the disk, and given a signature of a public key certificate publisher (certificate authority).

The reproduction device performs the verification process for verifying the root certificate to determine whether or not reproduction of the content recorded in the attachment disk is allowable, and whether or not continuation and execution of the application are allowable, for example.

When executing the verification process for the root certificate, the reproduction device calculates a transform value by applying a predetermined transform function to data constituting the root certificate, and stores and retains the calculated transform value in the storage unit of the reproduction device.

At the time of disk switching, comparison is made between a transform value calculated based on the root certificate of the preceding attachment disk (i.e., transform value stored in the storage unit) and a transform value newly calculated based on the root certificate of the subsequent disk. The reproduction device determines whether or not reproduction of the content recorded in the attachment disk is allowable and whether or not continuation and execution of the application are allowable, for example, based on the comparison result of the transform values.

In case of a combination of two continuous reproduction disks for recording a first part and a second part divided from a movie content, respectively, for example, the content owner of the storage content of the preceding attachment disk becomes identical to the content owner of the subsequent attachment disk. Accordingly, an identical root certificate is recorded both in the preceding attachment disk and the subsequent attachment disk. According to the processes of the present disclosure, determination of attachment of a correct continuous reproduction disk is made based on comparison between transform values obtained from the respective root certificates.

According to the processes of the present disclosure, different transform value calculation functions are applied to the transform value calculation process in accordance with versions of the disks in a calculation process for calculating root certificate transform values. This transform value calculation process corresponding to respective versions allows determination of identicalness of the disk version based on the comparison result between the transform value of the root certificate of the preceding attachment disk and the transform value of the root certificate of the subsequent attachment disk.

This process is further detailed below.

When the second disk 52 is attached to the reproduction device at the time Ta illustrated in FIG. 9, for example, the reproduction device reads the root certificate from the second disk, and calculates a transform value by applying a predetermined transform function based on the read root certificate.

The reproduction device further obtains a transform value from the storage unit of the reproduction device as a value calculated based on the root certificate of the first disk, and determines whether or not reproduction of content is allowable, and whether or not continuation and execution of the application are allowable, for example, based on comparison between the two transform values.

These processes are executed under control by a verification process execution program stored beforehand in the reproduction device. Alternatively, these processes may be executed under control by the application read from the first disk 51 and executed after removal of the first disk 51, i.e., the application executed during the period from the time T1 to the time T2 illustrated in FIG. 9.

The specific processing sequence is further detailed below.

As described above, a root certificate is a public key certificate recorded in a disk together with content. A root certificate is used as a certificate for determining correctness of content recorded in a disk, for example.

Figure 10:
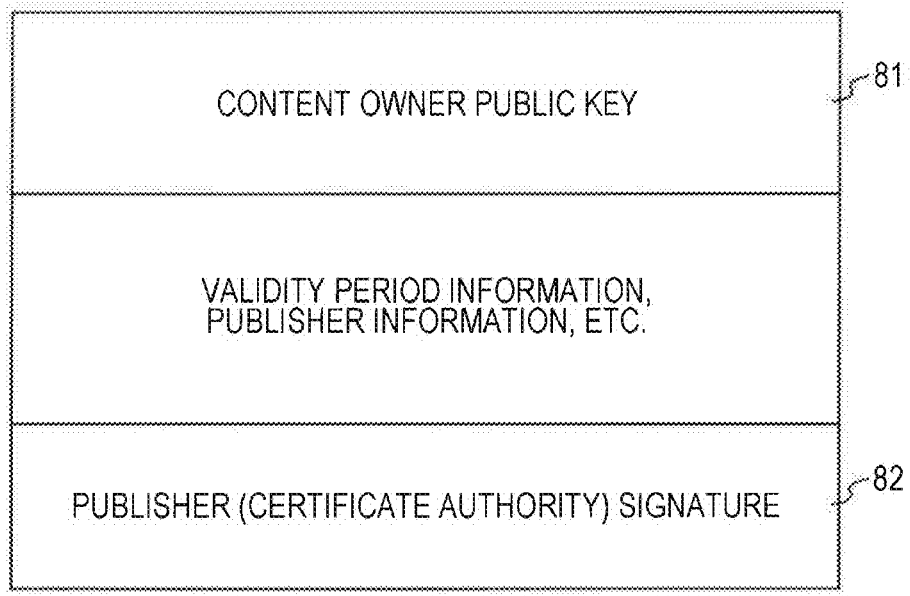
FIG. 10 is a view illustrating a configuration example of a root certificate.

A configuration example of a root certificate is illustrated in FIG. 10.

A root certificate is a public key certificate which stores a public key of a content owner such as a content creator and a content manager, and is given a signature of a public key certificate publisher (certificate authority).

As illustrated in FIG. 10, a root certificate contains the following data.

Content owner public key 81
Publisher (certificate authority) signature 82

The publisher (certificate authority) signature 82 is generated by applying a secret key of the publisher (certificate authority) to data constituting the root certificate and containing the content owner public key 81. A signature verification process for verifying this signature achieves correctness confirmation of the root certificate (public key certificate), i.e., modification verification. The signature verification process may be executed by applying a public key of the publisher (certificate authority).

A processing sequence executed by the reproduction device is hereinafter described with reference to flowcharts shown in FIG. 11 and figures after FIG. 11.

Figure 11:
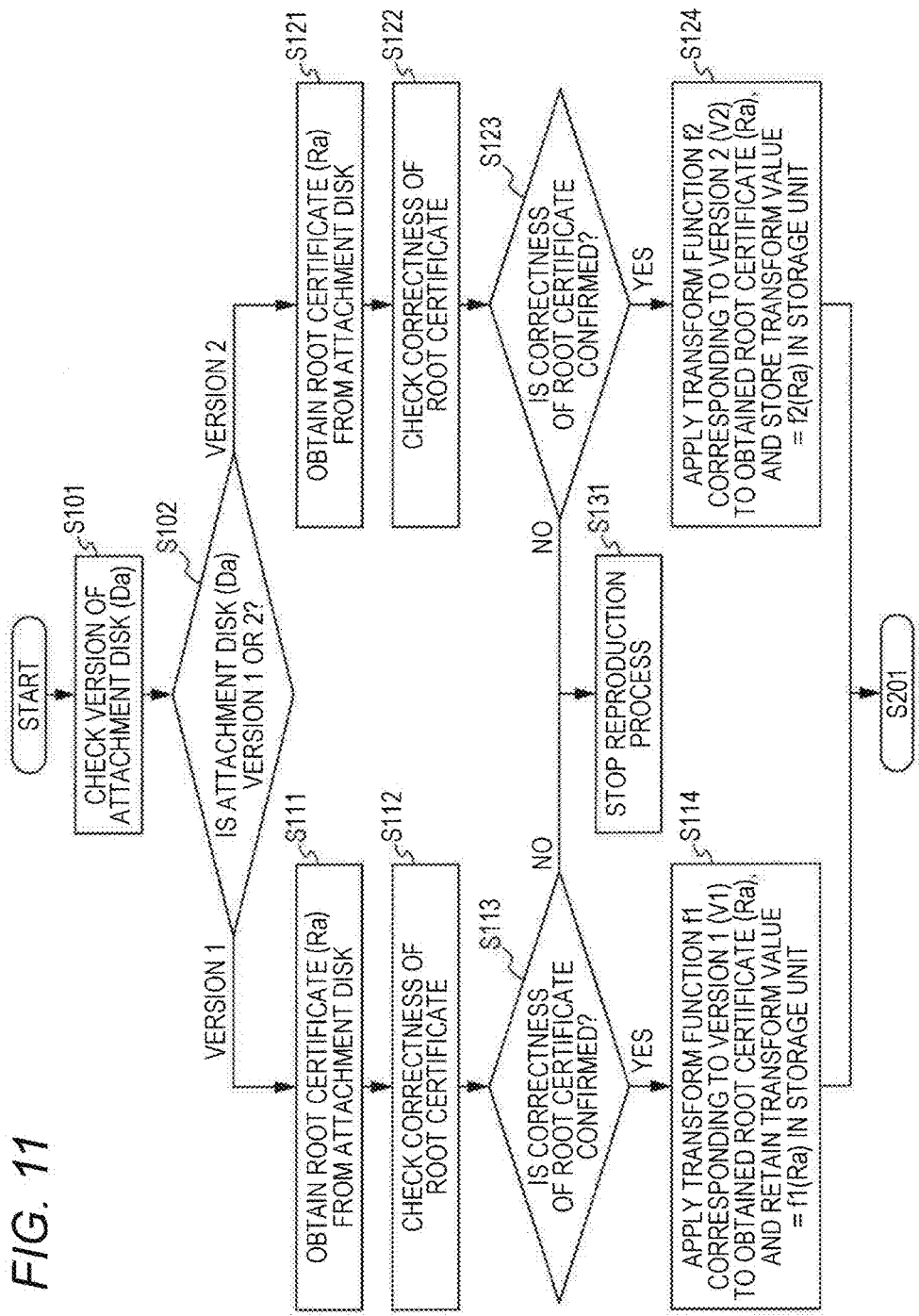
FIG. 11 is a flowchart showing a processing sequence executed by a reproduction device according to an embodiment of the present disclosure.

The processes according to the flows illustrated in FIG. 11 and the figures after FIG. 11 are executed by a data processing unit including a CPU and other components having a program execution function of the reproduction device. The program is stored in a memory of the reproduction device. Alternative the program read from a medium such as a disk is executed.

The processes may be executed by using an application (disc-unbound application) read from a disk.

For example, in the settings shown in FIG. 9, the processes may be executed under control by an application read from the first disk 51 and executed after removal of the first disk 51, i.e., an application executed during the period from the time T1 to the time T2.

It is assumed that the reproduction device is in an initial state at a start time of the flows shown in FIG. 11 and the figures after FIG. 11. In this state, no disk is attached or removed, and no application is executed immediately before the start of the flows.

The reproduction device sequentially attaches the following two disks after the start of the flow shown in FIG. 11.
(a) Disk (Da)=preceding attachment disk
(b) Disk (Db)=subsequent attachment disk Processes in respective steps in the flowcharts shown in FIG. 11 and the figures after FIG. 11 are hereinafter sequentially described.
(Steps S101 through S102)

In steps S101 through S102, the data processing unit of the reproduction device checks the version of the disk (Da) newly attached to the reproduction device.

The disk version checking process is performed as a process for reading version information recorded in the disk.

The disk of version 1 storing HD content records version information indicating version 1.

The disk of version 2 storing UHD content records version information indicating version 2.

The reproduction device reads the version information and makes version determinations of:
whether or not the disk attached to the reproduction device is a disk of version 1 storing HD content; and whether or not the disk is a disk of version 2 storing UHD content.

When the version of the attachment disk (Da) is version 1 (HD disk), the flow proceeds to step S111.

When the version of the attachment disk (Da) is version 2 (UHD disk), the flow proceeds to step S121.

Processes from step S111 performed when the version of the attachment disk (Da) is version 1 (HD disk) are initially discussed.
(Step S111)

When the version of the attachment disk (Da) is version 1 (HD disk), the reproduction device reads a root certificate (Ra) from the attachment disk (Da) in step S111.

In the following description, the root certificate recorded in the preceding attachment disk (Da) is referred to as the root certificate (Ra).

On the other hand, a root certificate recorded in the subsequent attachment disk (Db) is referred to as a root certificate (Rb).
(Steps S112 through S113, S131)

In steps S112 through S113, the reproduction device executes a verification process for verifying the root certificate (Ra) read from the attachment disk (Da).

As described above with reference to FIG. 10, a root certificate is a public key certificate storing a public key of a content owner such as a content creator or a content manager, and is given a signature of a public key certificate publisher (certificate authority).

The publisher (certificate authority) signature 82 contained in the root certificate illustrated in FIG. 10 is generated for data (hash value) constituting the root certificate and containing the content owner public key 81 by an encryption process applying a secret key of the publisher (certificate authority).

In step S112, the verification process is executed for this signature. This signature verification achieves correctness check of the root certificate (public keys certificate), i.e., modification verification.

The signature verification process is executed by applying the public key of the publisher (certificate authority).

When correctness of the root certificate is verified by the signature verification process for the root certificate (Ra), the flow proceeds to step S114.

When correctness of the root certificate is not confirmed by the signature verification process for the root certificate (Ra) the flow proceeds to step S131 to stop data reproduction from the attachment disk (Da), more specifically, content reproduction of a movie or the like recorded in the disk (Da), and stop execution of the application.
(Step S114)

When correctness of the root certificate is confirmed by the signature verification process for the root certificate (Ra) the reproduction device calculates a transform value by applying a predetermined transform function f1 specified beforehand to the data constituting the obtained root certificate (Ra), and stores the calculated transform value in the storage unit of the reproduction device in step S114.

The transform function applied to the transform value calculation is determined in accordance with the version of the disk.

According to this example, the disk (Da) is a HD disk storing HD content of version 1 (V1), wherefore the reproduction device applies the transform function f1 associated with version 1 (V1).

The reproduction device calculates a transform value f1(Ra) by applying the transform function f1 corresponding to version 1 to the data constituting the root certificate (Ra) read from the disk (Da) of version 1.

The transform function f1 is a hash function, for example. In this case, the value f1(Ra) becomes a hash value of the data constituting the root certificate (Ra).

The reproduction device calculates the hash value f1(Ra) applying the hash function f1 associated with the disk of version 1 to the data constituting the root certificate (Ra), and stores the calculated hash value f1(Ra) in the storage unit of the reproduction device.
(Steps S121 through S124, S131)

Hereinafter described are processes from step S121 performed when the version of the attachment disk (Da) is version 2 (UHD disk) in the version determination process for the attachment disk in steps S101 through S102.

Processes in steps S121 through S123 are similar to the processes in steps S111 through S113.

When the version of the attachment disk (Da) is version 2 (UHD disk), the reproduction device reads the root certificate (Ra) from the attachment disk (Da) in step S121.

In steps S122 through S123, the verification process for the root certificate (Ra) read from the attachment disk (Da) is executed.

The signature verification process is executed by applying the public key of the publisher (certificate authority).

When correctness of the root certificate is confirmed by the signature verification process for the root certificate (Ra) the flow proceeds to step S124.

When correctness of the root certificate is not confirmed by the signature verification process for the root certificate (Ra), the flow proceeds to step S131 to stop data reproduction from the attachment disk (Da), more specifically, content reproduction of a movie or the like recorded in the disk (Da), and stop execution of the application.

When correctness of the root certificate is confirmed by the signature verification process for the root certificate (Ra), the reproduction device calculates a transform value by applying a predetermined transform function f2 specified beforehand to the data constituting the obtained root certificate (Ra), and stores the calculated transform value in the storage unit of the reproduction device in step S124.

As described above, the transform function applied to the transform value calculation is determined in accordance with the version of the disk.

According to this example, the disk (Da) is a UHD disk storing UHD content of version 2 (V2), wherefore the reproduction device applies the transform function f2 associated with version 2 (V2).

A transform value f2(Ra) is calculated by applying the transform function f2 associated with version 2 to the data constituting the root certificate (Ra) read from the disk (Da) of version 2.

The transform function f2 is a transform function different from the transform function f1. The transform function f2 may be a hash function adopting an algorithm different from the algorithm of the transform function f1, for example. The reproduction device calculates a hash value by applying the hash function f2 associated with the disk of version 2 to the data constituting the root certificate (Ra), and stores the calculated hash value in the storage unit of the reproduction device.

The function f1 and the function f2 are different transform functions, wherefore values venerated by applying the respective functions based on identical data A, i.e., values f1(A) and f2(A) become different values.

The transform value f1(Ra) and the transform value f2(Ra) obtained by applying the transform function f1 and the transform function f2, respectively, to the identical root certificate (Ra) become different values.

Accordingly, f1(Ra)≠f2(Ra) holds.

Specific examples of the transform functions f1 and f2 are now described with reference to FIG. 12.

FIG. 12 illustrates three different setting examples (1), (2), and (3) of the functions f1 and f2.

(1) is an example of which the function f1 is a function applicable only once to data readable from a disk, such as the data A constituting the root certificate, while the function f2 is a function which repeatedly applies the function f1 twice to the data A. Accordingly, f2(A)=f1(f1(A)) holds.

For example, a hash function SHA-1 or SHA-256 may be used as the function f1.

When a hash function h1 to be applied is SHA-1, for example, the function f1 performs a process for applying the hash function h1 once to data constituting the root certificate read from the disk, such as the data A.

Accordingly, f1(A)=h1(A) holds.

On the other hand, the function f2 performs a process for applying the hash function h1 twice to data constituting the root certificate read front the disk, such as the data A. Accordingly, f2(A)=h1(h1(A)) holds.

The function setting example of (2) in FIG. 12 is an example which determines the function f1 and the function f2 as different data transform functions.

For example, the function f1 is a function constituted by a first hash function h1, while the function f2 is a function constituted by a second hash function h2 different from the first hash function h1.

For example, the first hash function h1 is SHA-1, while the second hash function h2 is SHA-256.

In this case, the function f1 performs a process for applying the first hash function h1 to data constituting the root certificate read from the disk, such as the data A. Accordingly, f1(A)=h1(A) holds.

On the other hand, the function f2 performs a process for applying the second hash function h2 to data constituting the root certificate read from the disk, such as the data A. Accordingly, f2(A)=h2(A) holds.

The function setting example of (3) in FIG. 12 is an example which determines the function f2 as a function for connecting results of the function f1.

For example, the function f1 is a function constituted by the first hash function, while the function f2 is a function executing a process for connecting results obtained by applying the first hash function.

For example, the function f1 is constituted by a hash function h1=SHA-1.

In this case, the function f1 performs a process for applying the first hash function h1 to data constituting the root certificate read from the disk, such as the data A. Accordingly, f1(A)=h1(A) holds.

On the other hand, the function f2 performs a process for connecting results obtained by applying the hash function h1 to data constituting the root certificate read from the disk, such as the data A.

Accordingly, f2(A)=h1(A)∥h1(A) holds.

In this equation, a∥b indicates a connection process for connecting data a and data b.

Figure 13:
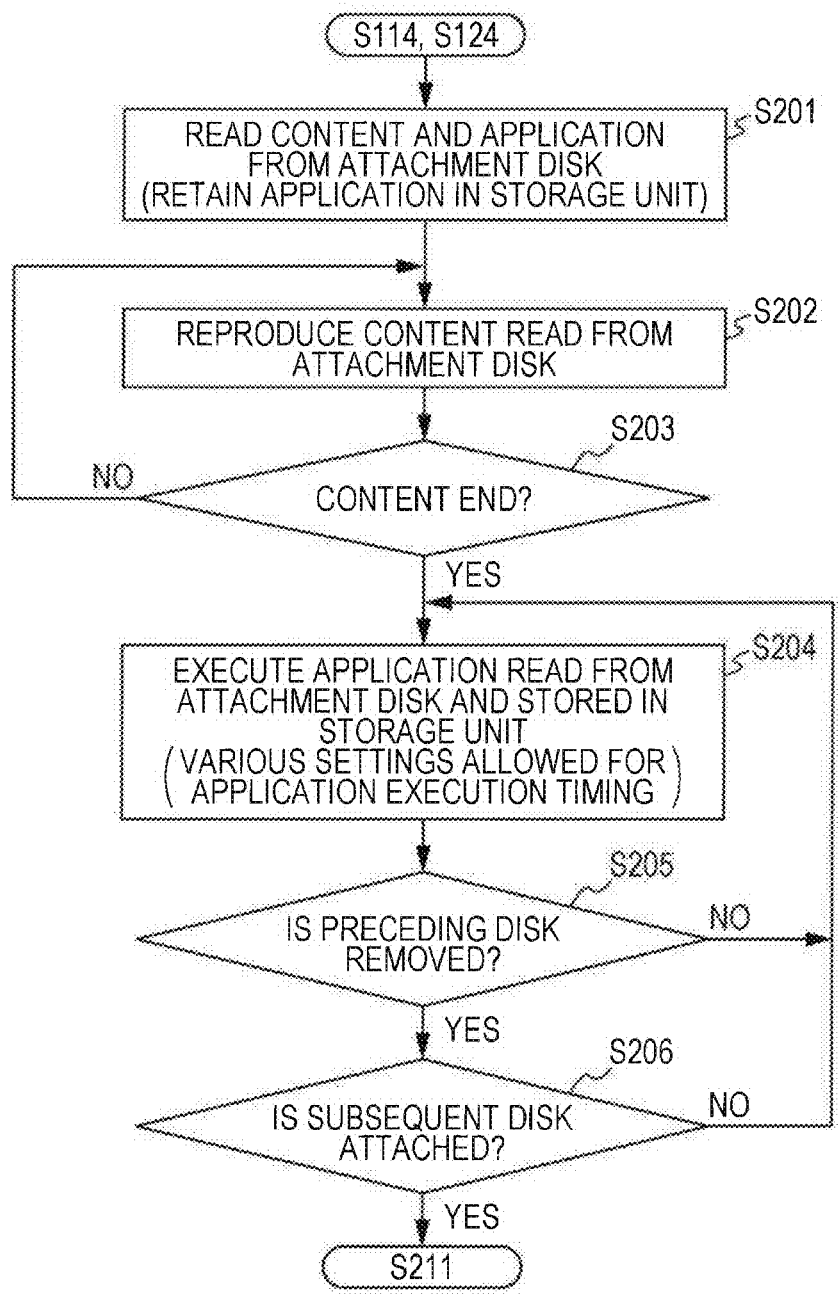
FIG. 13 is a flowchart showing a processing sequence executed by the reproduction device according to an embodiment of the present disclosure.
Figure 14:
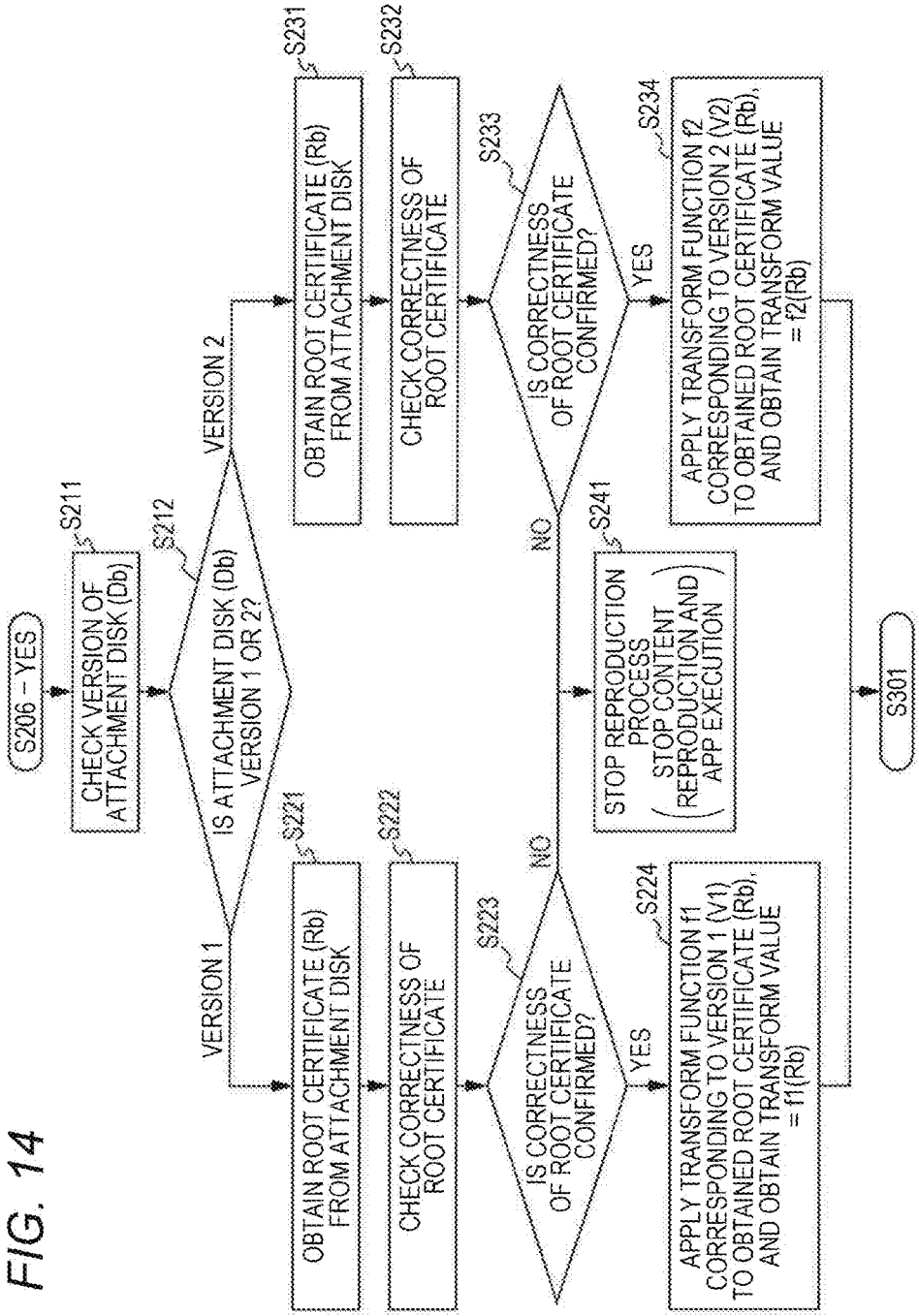
FIG. 14 is a flowchart showing a processing sequence executed by the reproduction device according to an embodiment of the present disclosure.

In step S114 or step S124 in the flowchart shown in FIG. 11, the transform value (f1(Ra) or f2(Ra)) calculated based on the root certificate (Ra) read from the preceding attachment disk (Da) is stored in the storage unit. Then, the reproduction device executes processes from step S201 shown in FIG. 13.

The processes from step S201 are now sequentially described.

(Step S201)

In step S201, the reproduction device reads content and an application from the attachment disk (Da). The read application is retained in the storage unit.

The application read herein is a disc-unbound application executed even after removal of the disk.

(Steps S202 through S203)

In step S202, the reproduction device starts reproduction of content read from the preceding attachment disk (Da).

(Step S204)

After completion of content reproduction (step S203 (Yes)) the application read from the disk (Da) and retained in the storage unit is executed in step S204.

As described above with reference to FIGS. 2 through 5, various settings are allowed for application execution timing.

The flow presented herein only by way of example is a process performed when the application is executed after completion of content reproduction of the preceding attachment disk, similarly to the case shown in FIG. 2.

(Steps S205 through S206)

Executed in steps S205 through S206 are removal of the preceding attachment disk (Da), and an attachment checking process of the subsequent attachment disk (Db).

Before removal of the preceding attachment disk (Da) and attachment confirmation of the subsequent attachment disk (Db), the application (disc-unbound application) read from the disk (Da) is continuously executed.

After removal of the preceding attachment disk (Da) and attachment confirmation of the subsequent attachment disk (Db), the flow proceeds to step S211.

(Steps S211 through S212)

In steps S211 through S212, the data processing unit of the reproduction device checks the version of the subsequent attachment disk (Db) newly attached to the reproduction device.

As described above, the disk version verification process is Performed as a process for reading version information recorded in the disk.

The disk of version 1 storing RD content records version information indicating version 1.

The disk of version 2 storing UHD content records version information indicating version 2.

The reproduction device having read the version information determines whether the disk attached to the reproduction device is a disk of version 1 storing HD content, or a disk of version 2 storing UHD content.

When the version of the subsequent attachment disk (Db) is version 1 (HD disk) the flow proceeds to step S221.

When the version of the subsequent attachment disk (Db) is version 2 (UHD disk), the flow proceeds to step S231.

Discussed initially are processes from S221 performed when the version of the subsequent attachment disk (Db) is version 1 (HD disk).

(Steps S221 through S223, S241)

Processes in steps S221 through S223 are similar to the processes in steps S111 through S113 described above with reference to the flow in FIG. 11.

When the version of the subsequent attachment disk (Db) is version 1 (HD disk), the reproduction device reads the root certificate (Rb) from the subsequent attachment disk (Db) in step S221.

In steps S222 through S223, a verification process for the root certificate (Rb) read from the subsequent attachment disk (Db) is executed.

The signature verification process is executed by applying the public key of the publisher (certificate authority).

When correctness of the root certificate is confirmed by the signature verification process for the root certificate (Rb), the flow proceeds to step S224.

When correctness of the root certificate is not confirmed by the signature verification process for the root certificate (Rb), the flow proceeds to step S241 to stop data reproduction from the subsequent attachment disk (Db), more specifically, content reproduction of a movie or the like recorded in the subsequent attachment disk (Db), and stop execution of the application.

In addition, execution of the application read from the preceding attachment disk (Da) and continuously executed is similarly stopped.

(Step S224)

When correctness of the root certificate is confirmed by the signature verification process for the root certificate (Rb) read from the subsequent attachment disk (Db), the reproduction device calculates a transform value in step S224 by applying the predetermined transform function f1 to data constituting the obtained root certificate (Rb).

As described above, the transform function applied to the transform value calculation is determined in accordance with the version of the disk.

According to this example, the subsequent attachment disk (Db) is a HD disk storing HD content of version 1 (V1), wherefore the reproduction device applies the transform function f1 associated with version 1 (V1).

The transform value f1(Rb) is calculated by applying the transform function f1 corresponding to version 1 to data constituting the root certificate (Rb) read from the subsequent attachment disk (Db) of version 1.

The transform function f1 is a hash function, for example, wherefore f1(Rb) becomes a hash value of data constituting the root certificate (Rb).

The reproduction device applies the hash function f1 associated with the disk of version 1 to the data constituting the root certificate (Rb) to calculate the hash value.

(Steps S231 through S234, S241)

Discussed hereinafter are processes from step S231 performed when the version of the subsequent attachment disk (Db) is version 2 (UHD disk) in the version determination process in steps S211 through S212.

The processes in steps S231 through S233 are similar to the processes in steps S221 through S223 described above. When the version of the subsequent attachment disk (Db) is version 2 (UHD disk), the reproduction device reads the root certificate (Rb) from the subsequent attachment disk (Db) in step S231.

In steps S232 through S233, the verification process is executed for the root certificate (Rb) read from the subsequent attachment disk (Db).

The signature verification process is executed by applying the public key of the publisher (certificate authority).

When correctness of the root certificate is confirmed by the signature verification process for the root certificate (Rb), the flow proceeds to step S234.

When correctness of the root certificate is not confirmed by the signature verification process for the root certificate (Rb), the flow proceeds to step S241 to stop data reproduction from the subsequent attachment disk (Db), more specifically, content reproduction of a movie or the like recorded in the subsequent disk (Db), and stop execution of the application. In addition, execution of the application read from the preceding attachment disk (Da) and continuously executed is similarly stopped.

When correctness of the root certificate is confirmed by the signature verification process for the root certificate (Rb) the reproduction device calculates a transform value in step S234 by applying the predetermined transform function f2 to data constituting the obtained root certificate (Rb).

As described above, the transform function applied to the transform value calculation is determined in accordance with the version of the disk.

According to this example, the subsequent attachment disk (Db) is a UHD disk storing UHD content of version 2 (V2), wherefore the reproduction device applies the transform function f2 associated with version 2 (V2).

The transform value f2(Rb) is calculated by applying the transform function f2 corresponding to version 2 to data constituting the root certificate (Rb) read from the subsequent attachment disk (Db) of version 2.

The transform function f2 is a transform function different from the transform function f1. The transform function f2 is constituted by a hash function adopting an algorithm different from the algorithm of the transform function f1, for example.

The reproduction device calculates a hash value f2(Rb) by applying the hash function f2 associated with the disk of version 2 to data constituting the root certificate (Rb).

After completion of calculation of transform value (f1 (Rb) or f2(Rb)) based on the root certificate (Rb) of the subsequent attachment disk (Db) in step S224 or step S234, the flow proceeds to step S301 shown in FIG. 15.

Discussed hereinafter are processes performed from step S301 with reference to a flowchart shown in FIG. 15.

(Step S301)

In step S301, the data processing unit of the reproduction device compares the transform value (f1(Rb) or f2(Rb)) calculated based on the root certificate (Rb) of the subsequent attachment disk (Db) with the transform value (f1(Ra) or f2(Ra)) calculated based on the root certificate (Ra) of the preceding attachment disk (Da) stored in the storage unit.

(Step S302)

The data processing unit of the reproduction device determines whether or not the transform values compared in step S301 match with each other.

More specifically, when either f1(Rb)=f1(Ra) (Equation 1), or f2(Rb)=f2(Ra) (Equation 2) holds, it is determined that the two transform values match one another.

More specifically, either (Equation 1) or (Equation 2) holds when the versions of the preceding attachment disk (Da) and the subsequent attachment disk (Db) match between the root certificates (Ra, Rb) stored in the respective disks.

As described above, in a combination of disks each storing content intended to be continuously reproduced, such as a combination of two disks recording a first part and a second part divided from movie content, respectively, for example, the content owner of the storage content of the preceding attachment disk is identical to the content owner of the storage content of the subsequent attachment disk.

Accordingly, an identical root certificate is recorded in each of the preceding attachment disk and the subsequent attachment disk.

According to the processes of the present disclosure, whether or not a correct continuous reproduction disk has been attached is determined based on comparison between transform values obtained from the respective root certificates. In addition, according to the processes of the present disclosure, different transform value calculation functions are applied to the respective versions of the disks in the root certificate transform value calculation process. The structure of transform value calculation corresponding to respective versions allows determination of identicalness of the versions of the attachment disks based on comparison between the root certificate transform values.

When the two transform values calculated based on the two root certificates compared in step S302 match one another, the flow proceeds to step S311.

When the two transform values compared in step S302 do not match one another, the flow proceeds to step S321.

(Step S311)

When the two transform values compared in step S302 match one another, it is determined that the versions of the preceding attachment disk (Da) and the subsequent attachment disk (Db) match one another, and that the root certificates (Ra, Rb) stored in the respective disks match one another in step S311. Accordingly, it is determined that the disks are a correct combination of continuous reproduction disks.

(Step S312)

When it is determined in step S311 that the disks are a correct combination of continuous reproduction disks based on the confirmation that the versions of the preceding attachment disk (Da) and the subsequent attachment disk (Db) match one another, and that the root certificates (Ra, Rb) stored in the respective disks match one another, the reproduction device reads content from the subsequent attachment disk (Db) to start a reproduction process in step S312.

The reproduction device reads an application, stores the application in the storage unit, and executes the application as necessary.

The reproduction device allows execution of the application under continuous execution read from the preceding attachment disk (Da) and stored in the storage unit.

(Step S321)

On the other hand, when the two transform values compared in step S302 do not match one another, it is determined in step S321 that the disks are not a correct combination of continuous reproduction disks based on either the versions of the preceding attachment disk (Da) and the subsequent attachment disk (Db) not matching, or the root certificates (Ra, Rb) stored in the respective disks not matching.

(Step S322)

When it is determined that the disks are not a correct combination of continuous reproduction disks based on a failure in confirming at least either matching between the versions of the preceding attachment disk (Da) and the subsequent attachment disk (Db), or matching between the root certificates (Ra, Rb) stored in the respective disks in step S321, the reproduction device executes a process in step S322.

In step S322, the reproduction device stops the application under execution, or outputs a warning indicating that a disk other than a continuous reproduction disk has been attached. More specifically, the reproduction device outputs a warning indicating that a disk of different version, or a disk recording a different root certificate has been attached, for example.

In this case, processes such as content reproduction from the subsequent attachment disk (Db), and reading and execution of the application, for example, are not performed.

The warning output process and the reproduction control process described herein may be executed by a process of the application under execution read from the preceding attachment disk (Da).

In step S302 in the flow shown in FIG. 15, the user is given a warning notification indicating that the disks are not a correct combination of continuous reproduction disks when the transform value of the root certificate (Ra) read from the preceding disk (Da) does not match the transform value of the root certificate (Rb) read from the subsequent attachment disk (Db).

On the other hand, in step S302 in the flow shown in FIG. 15, no notification is given to the user when the transform value of the root certificate (Ra) read from the preceding disk (Da) matches the transform value of the root certificate (Rb) read from the subsequent attachment disk (Db).

This process is presented only by way of example. The user may be also given a notification indicating that the disks are a correct combination of continuous reproduction disks when the transform value of the root certificate (Ra) read from the preceding disk (Da) matches the transform value of the root certificate (Rb) read from the subsequent attachment cask (Db).

FIG. 16 shows a flow including this notification process.

A flowchart in FIG. 16 is a flow including step S311b as well as the flow shown in FIG. 15.

Other processing steps are similar to the corresponding steps in the flow shown in FIG. 15.

Step S311 in the flow shown in FIG. 16 is a process performed when the transform values compared in step S302 match one another. In step S311, the reproduction device determines that the disks are a correct combination of continuous reproduction disks based on determination of matching between the versions of the preceding attachment disk (Da) and the subsequent attachment disk (Db), and matching between the root certificates (Ra, Rb) stored in the respective disks.

According to the flow shown in FIG. 16, step S311b described below is executed after step S311.

(Step S311b)

The reproduction device outputs a message of notification that a correct continuous reproduction disk has been attached in step S311b.

More specifically, a notification is given to indicate that the disk is of an identical version, and that the attached disk records an identical root certificate.

Thereafter, the reproduction device reads content from the subsequent attachment disk (Db) to start a reproduction process in step S312.

The reproduction device reads an application, stores the application in the storage unit, and executes the application as necessary.

The reproduction device allows execution of the application under continuous execution read from the preceding attachment disk (Da) and stored in the storage unit.

These processes may be executed as processes by the application under execution read from the preceding at disk (Da).

As described with reference to FIGS. 11 through 16, the reproduction device allows the following processes only based on determination that correct continuous reproduction disks have been sequentially attached to the reproduction device.

(a) Content reproduction, and reading and execution of application from subsequent attachment disk (b) Continuous execution of application read from preceding attachment disk When it is determined that a correct continuous reproduction disk is not attached, the reproduction device stops the processes (a) and (b).

More specifically, the reproduction device stops not only the processes using data read from the subsequent attachment disk (content reproduction and application execution), but also the application under execution read from the preceding attachment disk during the disk switching period.

FIG. 17 shows a table listing these processing modes. FIG. 17 is a table (list) showing processes executed by the reproduction device in accordance with comparison results between versions of the preceding attachment disk (Da) and the subsequent attachment disk (Db), and root certificate transform values stored in the respective disks.

(A) Version of preceding attachment disk
(B) Version of subsequent attachment disk
(C) Comparison result of root certificate transform value The table specifies "(D) process executed by reproduction device" for each of combinations (1) through (6) for (A) through (C).

Entry (1) is an entry when disks of the following settings are continuously attached.

(A) Version of preceding attachment disk=version 1 (ED content storage disk)
(B) Version of subsequent attachment disk=version 1 (HD content storage disk)
(C) Comparison result matching between root certificate transform values, i.e., f1(Ra))=f1(Rb)

The settings of Entry (1) correspond to settings at the time of attachment of correct continuous reproduction disks of an identical version and indicating an identical root certificate transform value.

The reproduction device allows the following processes.
(a) Content reproduction from subsequent attachment disk, and reading and execution of application
(b) Continuous execution of application read from preceding attachment disk These processes allow continuous execution of content reproduction using the correct continuous reproduction disk, and execution of the application (including disc-unbound application).

Entry (2) is an entry performed when disks of the following settings are continuously attached.

(A) Version of preceding attachment disk=version 1 (HD content storage disk)
(B) Version of subsequent attachment disk=version 1 (HD content storage disk)
(C) Comparison result when root certificate transform values do not match, i.e., f1(Ra)≠f1(Rb)

The settings of Entry (2) correspond to settings at the time of attachment of incorrect continuous reproduction disks which are of an identical version hut have different root certificate transform values.

The reproduction device performs the following processes.
(a) Stop of content reproduction from subsequent attachment disk, stop of reading and execution of application
(b) Stop of continuation of application read from preceding attachment disk These processes stop content reproduction using the incorrect continuous reproduction disk, and stop execution of the application (including disc-unbound application).

Entry (3) is an entry performed when disks of the following settings are continuously attached.

(A) Version of preceding attachment disk=version 1 (HD content storage disk)
(B) Version of subsequent attachment disk=version 2 (UHD content storage disk)
(C) Comparison result when root certificate transform values do not match, i.e., f1(Ra)≠f2(Rb)

The settings of Entry (3) correspond to settings at the time of attachment of incorrect continuous reproduction disks of different versions and different root certificate transform values.

The reproduction device performs the following processes.
(a) Stop of content reproduction from subsequent attachment disk, stop of reading and execution of application
(b) Stop of continuation of application read from preceding attachment disk These processes stop content reproduction using the incorrect continuous reproduction disk, and stop execution of the application (including disc-unbound application).

Entry (4) is an entry performed when disks of the following settings are continuously attached.

(A) Version of preceding attachment disk=version 2 (UHD content storage disk)

(B) Version of subsequent attachment disk=version 1 (HD content storage disk)
(C) Comparison result when root certificate transform values do not match, i.e., f2(Ra)≠f1(Rb)

The settings of Entry (4) correspond to settings at the time of attachment of incorrect continuous reproduction disks of different versions and different root certificate transform values.

The reproduction device performs the following processes.
(a) Stop of content reproduction from subsequent attachment disk, stop of reading and execution of application
(b) Stop of continuation of application read from preceding attachment disk These processes stop content reproduction using the incorrect continuous reproduction disk, and stop execution of the application (including disc-unbound application).

Entry (5) is an entry performed, when disks of the following settings are continuously attached.
(A) Version of preceding attachment disk=version 2 (UHD content storage disk)
(B) Version of subsequent attachment disk=version 2 (UHD content storage disk)
(C) Comparison result matching between root certificate transform values, i.e., f2(Ra)=f2(Rb)

The settings of Entry (5) correspond to settings at the time of attachment of correct continuous reproduction disks of an identical version and indicating an identical root certificate transform value.

The reproduction device allows the following processes.
(a) Content reproduction from subsequent attachment disk, and reading and execution of application
(b) Continuous execution of application read from preceding attachment disk These processes allow continuous execution of content reproduction using the correct continuous reproduction disk, and execution of the application (including disc-unbound application).

Entry (6) is an entry performed when disks of the following settings are continuously attached.
(A) Version of preceding attachment disk=version 2 (UHD content storage disk)
(B) Version of subsequent attachment disk=version 2 (UHD content storage disk)
(C) Comparison result when root certificate transform values do not match, i.e., f2(Ra)≠f2(Rb)

The settings of Entry (6) correspond to settings at the time of attachment of incorrect continuous reproduction disks which are of an identical version but have different root certificate transform values.

The reproduction device performs the following processes.
(a) Stop of content reproduction from subsequent attachment disk, stop of reading and execution of application
(b) Stop of continuation of application read from preceding attachment disk These processes stop content reproduction using the incorrect continuous reproduction disk, and stop execution of the application (including disc-unbound application).

Accordingly, the reproduction device of the present disclosure compares the versions and the root certificate transform values between the preceding attachment disk and the subsequent attachment disk, and executes content reproduction and the application process by using the subsequent attachment disk only when identicalness of the versions and identicalness of the root certificate transform values are confirmed.

In addition, the reproduction device allows continuous execution of the application read from the preceding attachment disk.

When either identicalness of the versions or identicalness of the root certificate transform values is not confirmed, the reproduction device stops content reproduction and the application process using the subsequent attachment disk. In addition, the reproduction device stops continuous execution of the application read from the preceding attachment disk.

These processes realize correct performance of content reproduction using a correct continuous reproduction disk. On the other hand, a warning output process is performed, or the application read from the preceding attachment disk is stopped in response to attachment of a disk other than the correct continuous reproduction disk. Accordingly, the user may recognize attachment of the incorrect disk immediately after attachment of the subsequent disk.

4. Other Examples of Application Execution Control

Hereinafter described are other examples of application execution control in the data reproduction process including disk switching.

An example of an application execution mode in the data reproduction process including disk switching is discussed with reference to FIG. 18.

As illustrated in FIG. 18, content reproduction from a preceding attachment disk (Da) 91 is executed during a period from a time T0 to a time T1.

Then, content reproduction from a subsequent attachment disk (Db) 92 is executed during a period from a time T2 to a time T3 after the disk switching period from the time T0 to the time T1.

A disc-bound application 93 allowed to be executed under a condition of disk attachment is executed after execution of signature verification for a root certificate (Ra) recorded in the preceding attachment disk (Da) 91.

A disc-bound application 94 is executed after execution of the signature verification for a root certificate (Rb) recorded in the subsequent attachment disk (Db) 92.

On the other hand, a disc-unbound application 95 is executed after execution of the signature verification for the root certificate (Ra) recorded in the preceding attachment disk (Da) 91, and also executed after attachment of the subsequent attachment disk (Db) 92 even when signature verification for the root certificate (Rb) recorded in the subsequent attachment disk (Db) 92 is not performed.

According to the processes of the present disclosure, continuous execution of the disc-unbound application 95 is allowed when a transform value f(Ra) of the root certificate (Ra) recorded in the preceding attachment disk (Da) 91 matches a transform value f(Rb) of the root certificate (Rb) recorded in the subsequent attachment disk (Db) 92.

When the transform values do not match one another, continuous execution of the disc-unbound application 95 is not allowed. The application control configuration described with reference to the flows in FIGS. 11 through 16 performs these controls.

The processes performed when the transform value of the root certificate (Rb) is determined not to match may include a limiting process for prohibiting the application (disc-unbound application) from accessing a resource recorded in the subsequent attachment disk 92, as well as the process for stopping execution of the application. This setting allows execution of the application, but prohibits the application from reading data from the subsequent attachment disk.

5. Reproduction Process Using Data Stored in Local Storage Unit

The reproduction device is capable of performing a process for reading and reproducing data recorded in a local storage unit contained in the reproduction device, such as a built-in hard disk of the reproduction device, in accordance with the reproduction process of content stored in the attachment disk.

In other words, disk recorded content and content stored in the local storage unit may be reproduced in parallel.

Figure 19:
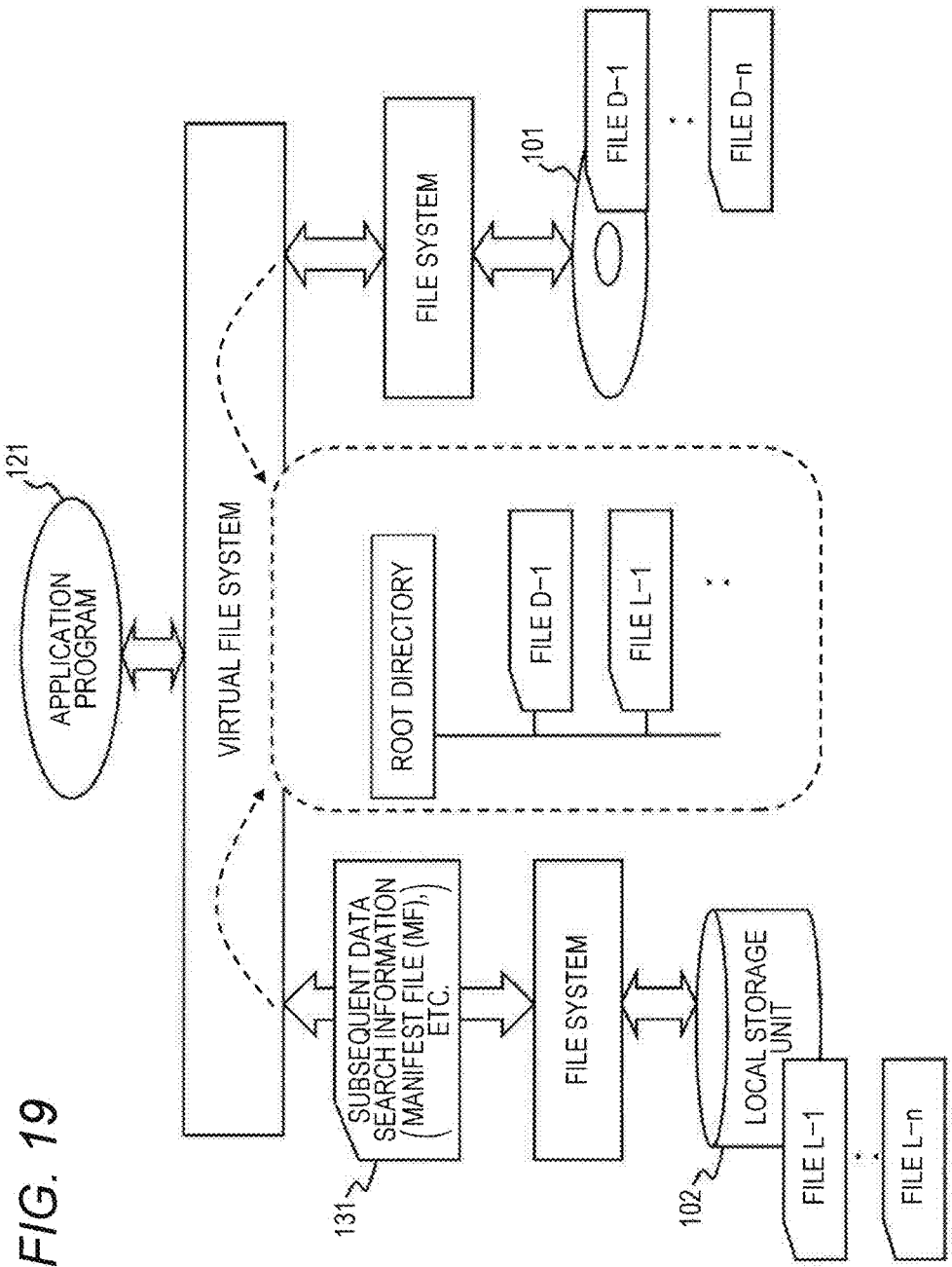
FIG. 19 is a view illustrating a virtual file system (VFS).

Discussed with reference to FIG. 19 is a virtual file system (VFS) set when storage content of a disk 101 and data (subsequent data) stored in a local storage unit 102 such as a hard disk are reproduced in parallel. For example, reproduction of a movie with Japanese subtitles is realizable by parallel reproduction of content stored in the disk 101 constituted by movie content in French, and data stored in the local storage unit 102 such as a hard disk and constituted by Japanese subtitle data corresponding to this movie content.

The data (subsequent data) stored in the local storage unit 102 such as a hard disk is constituted by data received from a server or the like via a network, for example.

For content reproduction using disk recorded content and content stored in the local storage unit, the reproduction device virtually synthesizes a directory and a file including a subsequent data management file and stored in the local storage unit 102 with a directory and a file of the disk 101. In other words, the reproduction device establishes a virtual file system (VFS). This virtual file system (VFS) constituting process is a process for handling the data file in the disk and the subsequent data file corresponding to the disk and stored in the local storage unit as files in one virtual directory.

An application program 121 illustrated in FIG. 19 is an application program under which the reproduction device executes a reproduction process and the like, such as a subsequent data reproduction management program (BD-J app), or a program peculiar to the reproduction device and implemented in the reproduction device. The application program 121 is executed by the data processing unit of the reproduction device.

The application program 121 operates a file recorded in the disk 101, and a file recorded in the local storage unit 102 via the virtual file system (VFS) The application program 121 obtains necessary subsequent data file via the virtual file system (VFS) by using subsequent data search information 131 corresponding to search information about files recorded in the local storage unit 102.

The virtual file system (VFS) serves a function of concealing the difference between recording media (file systems) from the application program 121. Accordingly, the application program 121 is allowed to operate the files recorded in the respective recording media by using an identical API without recognizing the difference between the recording media where each file is recorded.

For example, the virtual file system (VFS) is generated by merging the file system of the disk 101 and the file system of the local storage unit 102 at the time of attachment of the disk to the device, or execution of the application program. The generated virtual file system (VFS) is stored in the memory of the reproduction device.

In general, the virtual file system (VFS) needs to be updated again when new content is desired to be added to the virtual fixe system (VFS) already constituted, for example.

Accordingly, for parallel reproduction of content stored in the disk 101 and subsequent data stored in the local storage unit 102, the reproduction device needs to establish the virtual file system (VFS).

In the process for constituting the virtual file system (VFS) described with reference to FIG. 19, the reproduction device needs to read subsequent data from the local storage unit 102 as data corresponding to the disk 101 attached to the reproduction device.

The local storage unit 102 constituted by a hard disk or the like records a number of subsequent data corresponding to various disks, wherefore the reproduction device needs to select subsequent data corresponding to the disk currently attached to the reproduction device to constitute the virtual file system (VFS).

A directory configuration example of data stored in the local storage unit 102 is hereinafter described with reference to FIG. 20.

Figure 20:
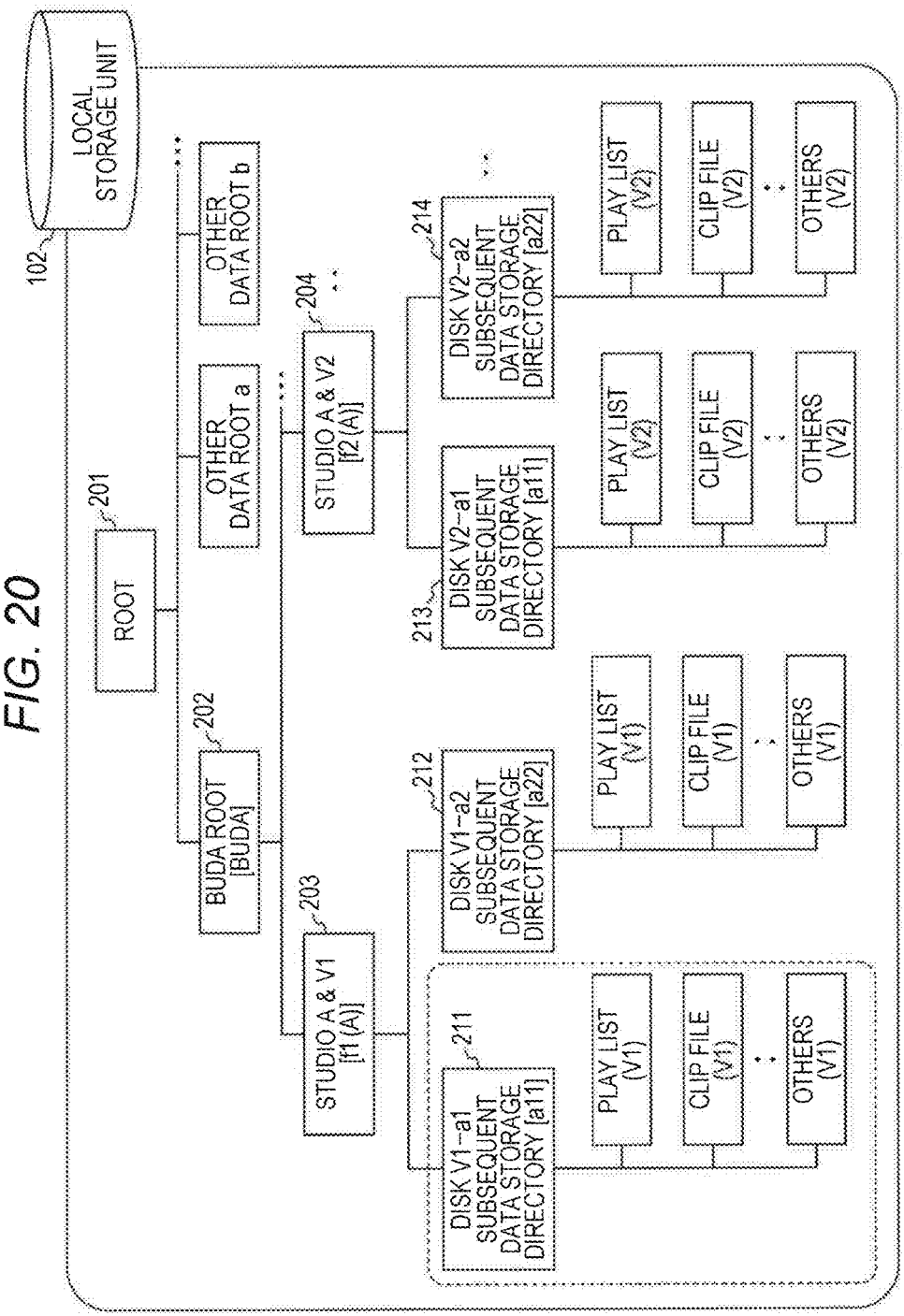
FIG. 20 is a view illustrating a directory configuration example of a local storage unit for securely obtaining subsequent data for a disk.

FIG. 20 is a view illustrating a directory setting example stored in the local storage unit 102.

It is assumed that subsequent data corresponding to disks of the following two different versions are recorded in the local storage unit 102.
(1) Subsequent data corresponding to disk of version 1 (V1)
(2) Subsequent data corresponding to disk of version 2 (V2)

For example, HD image content is recorded in the disk of version 1 (V1), and HD image content is recorded in subsequent data corresponding to the disk (V1).

On the other hand, UHD image content is recorded in the disk of version 2 (V2), and UHD image content is recorded in subsequent data corresponding to the disk (V2).

The decoding mode for the recorded content and subsequent data of the disk of version 1 (V1) is different from the decoding mode for the recorded content and subsequent data of the disk of version 2 (V2), wherefore data processing appropriate for the respective versions needs to be performed in the reproduction process.

An example of directory settings in the local storage unit 102 illustrated in FIG. 20 is hereinafter described. Respective sets of data are stored in accordance with a directory configuration constituted by hierarchies including a root directory 201 corresponding to the highest node and located at the top.

Sets of subsequent data corresponding to the respective disks and reproduced by using the virtual file system (VFS) are recorded below a BUDA (binding unit data area) root directory 202 located immediately below the root directory 201.

Provided below the BUDA root directory 202 are directories in units of a studio (i.e., content owner) and a version, that is, studio & version directories 203 and 204 in units of a studio corresponding to a creator of content recorded in the disk, and a version.

In a reproduction process for content created by studio A and of version 1, such as a disk (V1) recording HD content, subsequent data is selected from a data recording area below the studio A & V1 directory 203.

In a reproduction process for content created by studio A and of version 2, such as a disk (V2) recording UHD content, subsequent data is selected from a data recording area below the studio A & V2 directory 204.

Disk directories 211 through 214 corresponding to directories in units of a disk are set below the respective studio & version directories 203 and 204.

The disk directories 211 and 212 below the studio A & V1 directory 203 store only content created by studio A and of version 1, such as subsequent data associated with version 1 which corresponds to the disk (V1) and records HD content.

Disk directories 213 and 214 below the studio A & V2 directory 204 store only content created by studio A and of version 2, such as subsequent data associated with version 2 which corresponds to the disk (V2) and records UHD content.

Each of the disk directories 211 through 214 records subsequent data used for constitution of a virtual file system (VFS) in a content reproduction process of a particular disk. The subsequent data used for constitution of the virtual file system (VFS) includes a playlist file corresponding to a reproduction control information file, a clip information file storing reproduction section data and reproduction target data, a clip AV stream file constituted by reproduction image data and the like, for example. FIG. 20 illustrates a clip file containing both a clip information file and a clip AV stream file.

The data processing unit of the reproduction device selects and obtains subsequent data corresponding to the disk 101 of the particular version attached to the reproduction device from the subsequent data stored in the local storage unit 102 in accordance with the directory configuration illustrated in FIG. 20, and constitutes a virtual file system (VFS) to execute a reproduction process.

Version information about the disks (such as V1 and V2) is available from the disks.

According to the directory configuration illustrated in FIG. 20, the studio & version directories 203 and 204 in units of a studio and a version set below the BUDA root directory 202 have different directory names.

A specific setting example of directory names (node names) is hereinafter described.

A directory name (=node name) of the studio A & V1 directory 203 is f1(A).

The directory name f1(A) corresponds to a transform value obtained by applying the transform function f1 to the data A. The transform function f1 is a transform function described above with reference to FIG. 12 and other figures. More specifically, the transform function f1 is a hash function, for example, wherefore the value f1(A) is a hash value of the data A.

The data A corresponds to data constituting a root certificate recorded in the disk attached to the reproduction device (public key certificate of studio A). The data processing unit of the reproduction device obtains the data (A) constituting the root certificate recorded in the disk, and may calculate the transform value f1(A) of the data A by applying the function f1 specified beforehand.

More specifically, the function f1 is a hash value calculation function, such as SHA-1. In this case, the transform value f1(A) of the data A is a hash value of the data A.

A directory name (=node name) of the studio A & V2 directory 204 is f2(A).

The directory name f2(A) corresponds to a transform value calculated by applying the transform function f2 to the data A. The transform function f2 is a transform function different from the transform function f1. The function f2 is a hash function different from the function f1, for example. In this case, the value f2(A) becomes a hash value of the data A.

The data A corresponds to data constituting a root certificate recorded in the disk attached to the reproduction device (public key certificate of studio A) The data processing unit of the reproduction device obtains the data (A) constituting the root certificate recorded in the disk, and may calculate the transform value f2(A) of the data A by applying the function f2 specified beforehand.

However, the function f1 and the function f2 are different transform functions, wherefore the values generated by applying the respective functions based on the identical data A, i.e., the values f1(A) and f2(A) become different values. Accordingly, the directory name (=f1(A)) of the studio A & V1 directory 203 and the directory name (=f2(A)) of the studio A & V2 directory 204 have different settings.

According to this embodiment, therefore, different directories having different directory names in correspondence with the studio (=content owner) and the version are set in the subsequent data storage area of the local storage unit 102.

Below the directories in units of a studio and a version are set individual directories in units of a disk in correspondence with the studio and version. Subsequent data in units of a disk is recorded below the directories in units of a disk.

As a result, different directories are set for data in accordance with versions of disks even when root certificates (public key certificates) are constituted by identical data (such as data A) read from disks of an identical studio (=content owner) but of different versions. Accordingly, subsequent data associated with the corresponding studio and version is recorded in each of the directories.

A setting example of subsequent data recorded in the local storage unit 102 according to this embodiment is hereinafter described with reference to FIG. 21.

Figure 21:
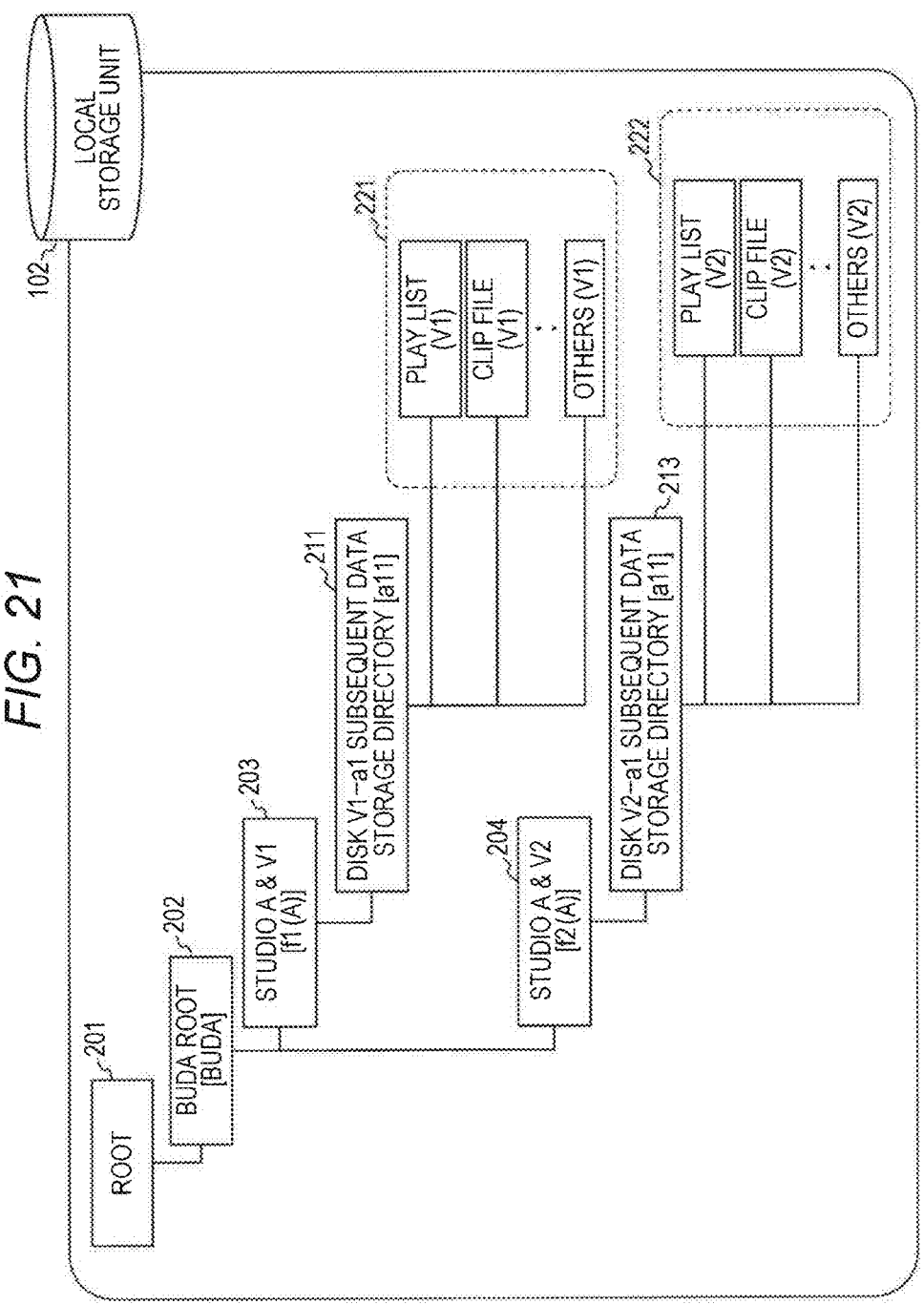
FIG. 21 is a view illustrating a directory configuration example of the local storage unit for securely obtaining subsequent data for a disk.

As illustrated in FIG. 21, the following two studio & version directories are set below the root directory 201 and the BUDA (binding unit data area) directory 202.

(1) Studio A & V1 directory 203
(2) Studio A & V2 directory 204

(1) A directory name (node name) of the studio A & V1 directory 203 is a value calculated by f1(A).
(2) A directory name (node name) of the studio A & V2 directory 204 is a value calculated by f2(A).

The data A is a root certificate stored in common in the disk of version 1 and the disk of version 2, i.e., data constituting the public key certificate of studio A.

(1) The disc (V1-a1) directory 211 corresponding to the disk ID=a1 is set below the studio A & directory 203, for example.

The subsequent data 221 corresponding to the disk (V1-a1) is recorded below this directory.

The subsequent data 221 is subsequent data corresponding to disk recorded content of version 1, such as HD content.

On the other hand, (2) the disk (V2-a1) directory 213 of disk ID=a1 having an identical ID is set below the studio A & V2 directory 204. Subsequent data 222 corresponding to the disk (V2-a1) is recorded below this directory.

The subsequent data 222 is subsequent data corresponding to disk record content of version 2, such as UHD content.

As described above, the HD image reproduction subsequent data 221 corresponding to version 1 (V1) and the UHD image reproduction subsequent data 222 corresponding to version 2 (V2) having an identical disk ID are separately recorded in different studio & version directories.

This subsequent data recording process allows the reproduction device to securely select and obtain only the subsequent data 221 corresponding to version 1 (V1), and constitute a virtual file system (VFS) to start reproduction at the time of attachment of the disk of version 1 (V1) for reproduction.

Similarly, reproduction of the attached disk of version 2 (V2) may be started by constituting a virtual file system (VFS) containing only the subsequent data 222 corresponding to the disk of version 2 (V2).

In this case, codec (decoding function) used by respective reproduction applications, for example, is applicable to subsequent data, wherefore reproduction using the virtual file system (VFS) is correctly performed without causing reproduction errors.

A directory name of a directory set in accordance with a studio and a disk version is calculated based on a root certificate read from a disk of each version, i.e., data constituting a public key certificate of a studio.

When data constituting a public key certificate of studio A is A, a directory name of a studio & version directory set in a subsequent data storage area corresponding to the disk of version 1 (V1) is a value f1(A) calculated by applying the function f1.

On the other hand, a directory name of a studio & version directory set in a subsequent data storage area corresponding to the disk of version 2 (V2) is a value f2(A) calculated by applying the function f2.

As surging that data constituting a public key certificate of studio B in case of a disk storing content created by studio B different from studio A is B, a directory name of a studio & version directory set in a subsequent data storage area corresponding to the disk of version 1 (V1) is a value f1(B) calculated by applying the function f1.

On the other hand, a directory name of a studio & version directory set in a subsequent data storage area corresponding to the disk of version 2 (V2) is a value f2(B) calculated by applying the function f2.

These directory name calculation functions f1 and f2 may be constituted by various functions.

The directory name calculation functions f1 and f2 may be constituted by functions having settings similar to the settings of the transform value calculation functions f1 and f2 described above with reference to FIG. 12.

As described above, a transform value calculated based on data constituting a root certificate, such as a hash value of data constituting the root certificate, is used as a directory name of a directory which stores data reproduced in parallel with disk recorded content.

This directory name setting process allows sectioning of data recording areas of the local storage unit in correspondence with content owners and disk versions of disk recorded content.

This structure allows selection of common data recording directories from the local storage unit and use of these directories when continuous reproduction disks of an identical version are used based on record of an identical root certificate, for example. Accordingly, errors caused by disk switching are avoidable in obtaining subsequent data.

When a subsequent attachment disk of a version different from the version of a preceding attachment disk is attached, a correct directory different from the directory of the preceding disk is selected from the local storage unit in correspondence with the disk version, even in a state of an identical root certificate recorded in each of the preceding attachment disk and the subsequent attachment disk.

6. Hardware Configuration Example of Information Processing Device

Figure 22:
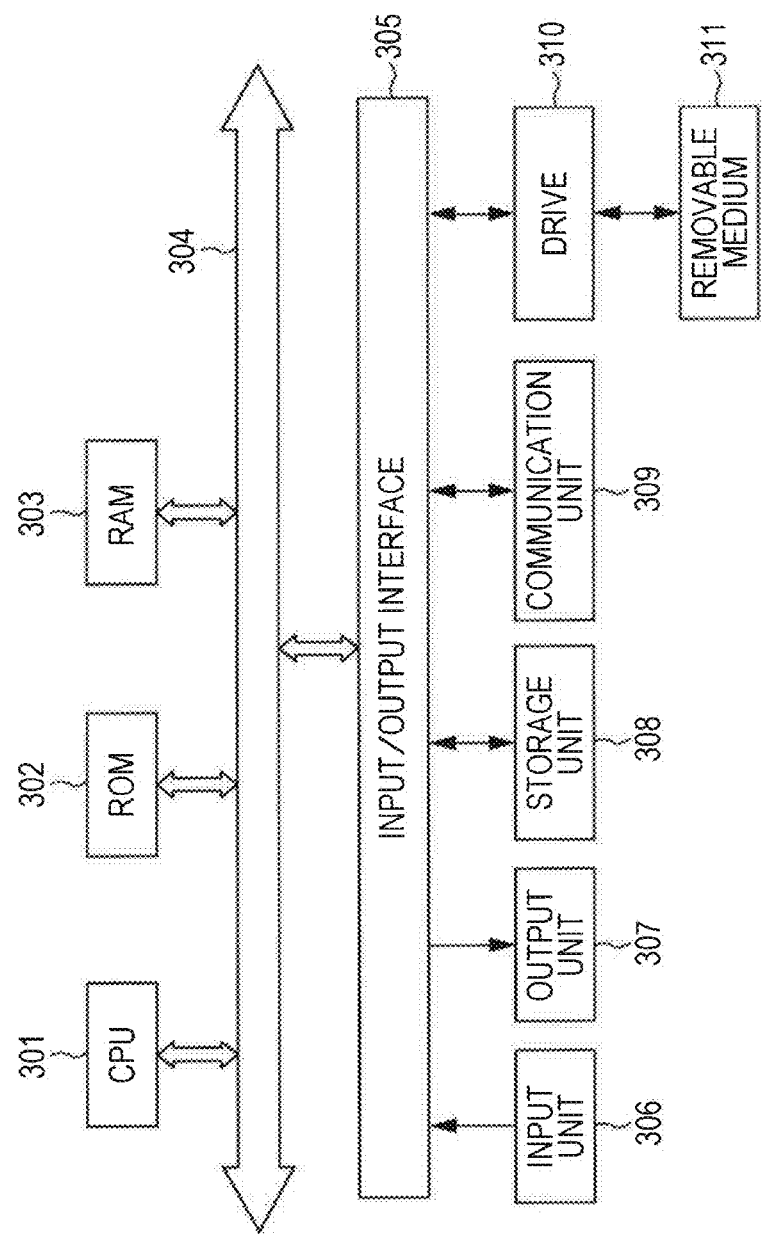
FIG. 22 is a view illustrating a hardware configuration example of an information processing device.

Finally described with reference to FIG. 22 is a hardware configuration example of the reproduction device which executes the foregoing processes.

A central processing unit (CPU) 301 functions as a data processing unit which executes various types of processes under programs stored in a read only memory (ROM) 302 or a storage unit 308. For example, the CPU 301 executes the data reproduction process, communication process for communicating with the server, and recording process for recording data in the storage unit after receiving the data from the server described in the foregoing examples. A random access memory (RAM) 303 stores programs executed by the CPU 301 and data when necessary. The CPU 301, the ROM 302, and the RAM 303 are connected with one another via a bus 304.

The CPU 301 is connected to an input/output interface 305 via the bus 304. An input unit 306 constituted by various types of switches, a keyboard, a mouse, a microphone and the like, and an output unit 307 constituted by a display, a speaker and the like are connected to the input/output interface 305. The CPU 301 executes various types of processes in response to instructions input from the input unit 306, and outputs processing results to the output unit 307, for example.

A storage unit 308 connected to the input/output interlace 305 is constituted by a hard disk, for example, and stores programs executed by the CPU 301 and various types of data. A communication unit 309 communicates with an external device via a network such as the Internet and a local area network.

A drive 310 connected to the input/output interface 305 drives a removable medium 311 such as a magnetic disk, an optical disk, a magneto-optical disk, and a semiconductor memory to obtain various types of data such as recorded content and key information. For example, decoding of content and a reproducing process are performed under a reproduction program executed by the CPU by using obtained content and key data.

7. Summary of Configuration of Present Disclosure

Embodiments of the present disclosure have been described in detail with reference to the particular examples. It is obvious, however, that modifications and substitutes for embodiments may be made by those skilled in the art without departing from the subject matters of the present disclosure. Accordingly, the disclosure of the present technology has been presented not for the purpose of limiting the scope of the present technology, but presented only by way of example. The subject matters of the present disclosure should be defined in consideration of the appended claims.

A technology disclosed in the present specification may have the following configurations.

(1) An information processing device including circuitry configured to control a data reproduction process for a first information recording medium and a second information recording medium, calculate a first root certificate transform value by applying a first transform function to data constituting a first root certificate recorded in the first information recording medium, calculate a second root certificate transform value by applying a second transform function to data constituting a second root certificate recorded in the second information recording medium, compare the first root certificate transform value and the second root certificate transform value, and based on a result of the comparison, continue a process under execution when the first and second root certificate transform values match, and stop the process under execution or output a warning when the first and second root certificate transform values do not match.

(2) The information processing device according to (1), wherein, based on a result of the comparison, the circuitry is configured to continue execution of an application read from the first information recording medium when the first and second root certificate transform values match, and stop execution of the application or output a warning when the first and second root certificate transform values do not match.

(3) The information processing device according to (1) or (2), wherein the circuitry is configured to read the application from the first information recording medium and store the application in the information processing device so that the application can be executed even after switching from the first information recording medium.

(4) The information processing device according to any one of (1) through (3), wherein
the first and second root certificates are public key certificates associated with storage content of the first and second information recording mediums, and
the transform function corresponds to a version of the first information recording medium.

(5) The information processing device according to any one of (1) through (4), wherein the root certificate is a public key certificate storing a public key of a content owner of the storage content of the information recording medium.

(6) The information processing device according to any one of (1) through (5), wherein
the first and second information recording mediums are either an information recording medium of version 1 (V1) or an information recording medium of version 2 (V2) requiring different data processing in a reproduction process, the circuitry is further configured to
execute a first directory name calculation process by applying a transform function f1 corresponding to version 1 to data constituting a root certificate recorded in the information recording medium (V1) when the information recording medium of version 1 (V1) is attached to the first information processing device, and
execute a second directory name calculation process by applying a transform function f2 corresponding to version 2 to data constituting a root certificate recorded in the information recording medium (V2) when the information recording medium of version 2 (V2) is attached to the first information processing device.

(7) The information processing device according to any of (1) through (6), wherein
the information recording medium of version 1 (V1) is an information recording medium storing HD (High Definition) content, and
the information recording medium of version 2 (V2) is an information recording medium storing HD (Ultra High Definition) content (8) The information processing device according to any of (1) through (7), wherein
the transform function f1 corresponding to version 1 is a hash function h1, and
the transform function f2 corresponding to version 2 is a function f2=h1 (h1) that repeats the hash function h1 twice.

(9) The information processing device according to any of (1) through (7), wherein
the transform fume f1 corresponding to version 1 is a hash function h1, and
the transform function f2 corresponding to version 2 is a hash function h2 different from the hash function h1.

(10) The information processing device according to any of (1) through (7), wherein
the transform function f1 corresponding to version 1 is a hash function h1, and
the transform function f2 corresponding to version 2 is a hash function f2=h1∥h1 that calculates a connection value of calculations value of the hash function h1.

(11) The information processing device according to any one of (1) through (10), wherein
the circuitry is further configured to
select data associated with the first information recording medium as reproduction target data stored in the information processing device,
execute a directory name calculation process by applying the transform function corresponding to the version of the information recording medium to the data constituting the root certificate recorded in the information recording medium, and
select data recorded in a directory having a calculated directory name as the reproduction target data.

(12) The information processing device according to any of (1) through (11), wherein
the first and second information recording mediums are either an information recording medium of version 1 (V1) or an information recording medium of version 2 (V2) requiring different data processing in a reproduction process, and
the circuitry is further configured to
execute a directory name calculation process by applying a transform function f1 corresponding to version 1 to data constituting a root certificate recorded in the information recording medium (V1) when the information recording medium of version 1 (V1) is attached to the information processing device, and
execute a directory name calculation process by applying a transform function f2 corresponding to version 2 to data constituting a root certificate recorded in the information recording medium (V2) when the information recording medium of version 2 (V2) is attached to the information processing device.

(13) An information recording medium that records:
content corresponding to a reproduction target of an information processing device;
a root certificate correspond to a public key certificate storing a public key of a content owner of the content; and
an application executable by the information processing device even after removal of the information recording medium from the information processing device, wherein
the application controls the information processing device to output a warning when a subsequent attachment information recording medium attached to the information processing device after removal of the information recording medium is not a correct continuous subsequent attachment information recording medium.

(14) The information recording medium according to (13), wherein
the information processing device calculates a root certificate transform value by applying a transform function corresponding to a version of the information recording medium to data constituting the root certificate recorded in the information recording medium,
the information processing device executes a comparison process for comparing the root certificate transform value based on the root certificate read from the information recording medium and a root certificate transform value based on a root certificate read from the subsequent attachment information recording medium, and the application outputs a warning when disagreement between the two root certificate transform values is confirmed by the information processing device.

(15) An information processing method performed by an information processing device, the method including controlling a data reproduction process for a first information recording medium and a second information recording medium,
calculating a first root certificate transform value by applying a transform function to data constituting a first root certificate recorded in the first information recording medium,
calculating a second root certificate transform value by applying a transform function to data constituting a second root certificate recorded in the second information recording medium,
comparing the first root certificate transform value and the second root certificate transform value, and
based on a result of the comparison, continuing a process under execution when the first and second root certificate transform values match, and stopping the process under execution or outputting a warning when the first and second root certificate transform values do not match.

(16) A non-transitory computer-readable storage medium having embodied thereon a program, which when executed by at least one processor of an information processing device causes the information processing device to execute an information processing method, the method including controlling a data reproduction process for a first information recording medium and a second information recording medium,
calculating a first root certificate transform value by applying a transform function to data constituting a first root certificate recorded in the first information recording medium,
calculating a second root certificate transform value by applying a transform function to data constituting a second root certificate recorded in the second information recording medium,
comparing the first root certificate transform value and the second root certificate transform value, and
based on a result of the comparison, continuing a process under execution when the first and second root certificate transform values match, and stopping the process under execution or outputting a warning when the first and second root certificate transform values do not match.

(17) An information processing device including a data processing unit that controls a data reproduction process including switching of an information recording medium, wherein
the data processing unit calculates a root certificate transform value by applying a transform function corresponding to a version of the information recording medium to data constituting a root certificate recorded in the information recording medium,
the data processing unit executes a comparison process for comparing a root certificate transform value based on a root certificate read from a preceding attachment information recording medium and a root certificate transform value based on a root certificate read from a subsequent attachment information recording medium, and
based on a result of the comparison process, the data processing unit continues a process under execution when agreement between the two transform values is confirmed, and stops the process under execution or outputs a warning when disagreement between the two transform values is confirmed.

(18) The information processing device according to (17), wherein, based on a result of the comparison process, the data processing unit continues execution of an application read from the preceding attachment information recording medium when agreement between the two transform values is confirmed, and stops execution of the application or outputs a warning when disagreement between the two transform values is confirmed.

(19) The information processing device according to (18), wherein the application is an application read from the preceding attachment information recording medium and recorded in a storage unit of the information processing device so that the application can be executed even after removal of the preceding attachment information recording medium.

(20) The information processing device according to any one of (17) through (19), wherein
the root certificate is a public key certificate associated with storage content of the information recording medium, and
the data processing unit calculates the root certificate transform value by applying a transform function corresponding to the version of the information recording medium to data constituting the public key certificate.

(21) The information processing device according to any one of (17) through (20), wherein the root certificate is a public key certificate storing a public key of a content owner of the storage content of the information recording medium,

(22) The information processing device according to any one of (17) through (21), wherein
the information recording medium is either an information recording medium of version (V1) or an information recording medium of version 2 (V2) requiring different data processing in a reproduction process,
the data processing unit executes a directory name calculation process by applying a transform function f1 corresponding to version 1 to data constituting a root certificate recorded in the information recording medium (V1) when the information recording medium of version 1 (V1) is attached to the information processing device, and the data processing unit executes a directory name calculation process by applying a transform function f2 corresponding to version 2 to data constituting a root certificate recorded in the information recording medium (V2) when the information recording medium of version 2 (V2) is attached to the information processing device

(23) The information processing device according to (22), wherein
the information recording medium of version 1 (V1) is an information recording medium storing HD (High Definition) content, and
the information recording medium of version 2 (V2) is an information recording medium storing UHD (Ultra High Definition) content.

(24) The information processing device according to (22) or (23), wherein
the transform function f1 corresponding to version 1 is a hash function h1, and
the transform function f2 corresponding to version 2 is a function f2=h1 (h1) that repeats the hash function h1 twice.

(25) The information processing device according to (22) or (23), wherein
the transform function f1 corresponding to version 1 is a hash function h1, and
the transform function f2 corresponding to version 2 is a hash function h2 different from the hash function h1.

(26) The information processing device according to (22) or (23), wherein the transform function f1 corresponding to version 1 is a hash function h1, and the transform function f2 corresponding to version 2 is a hash function f2=h1∥h1 that calculates a connection value of calculations value of the hash function h1.

(27) The information processing device according to any one of (17) through (26), wherein the data processing unit executes a process for selecting data associated with the information recording medium as reproduction target data from a local storage unit contained in the information processing device, in the selection process for selecting the reproduction target data, the data processing unit executes a directory name calculation process by applying a transform function corresponding to the version of the information recording medium to the data constituting the root certificate recorded in the information recording medium, and selects data recorded in a directory having a calculated directory name as reproduction target data from the local storage unit.

(28) The information processing device according to (27), wherein the information recording medium is either an information recording medium of version 1 (V1) or an information recording medium of version 2 (V2) requiring different data processing in a reproduction process, the data processing unit executes a directory name calculation process by applying a transform function f1 corresponding to version 1 to data constituting a root certificate recorded in the information recording medium (V1) when the information recording medium of version 1 (V1) is attached to the information processing device, and the data processing unit executes a directory name calculation process by applying a transform function f2 corresponding to version 2 to data constituting a root certificate recorded in the information recording medium (V2) when the information recording medium oil version 2 (V2) is attached to the information processing device.

(29) An information recording medium that records: content corresponding to a reproduction target of an information processing device;

a root certificate corresponding to a public key certificate storing a public key of a content owner of the content; and an application executable by the information processing device even after removal of the information recording medium from the information processing device, wherein the application allows the information processing device to output a warning when a subsequent attachment information recording medium attached to the information processing device after removal of the information recording media is not a correct continuous reproduction disk.

(30) The information recording medium according to (29), wherein the information processing device calculates a root certificate transform value by applying a transform function corresponding to a version of the information recording medium to data constituting a root certificate recorded in the information recording medium, the information processing device executes a comparison process for comparing a root certificate transform value based on a root certificate read from a preceding attachment information recording medium and a root certificate transform value based on a root certificate read from a subsequent attachment information recording medium, and the application outputs a warning when disagreement between the two transform values is confirmed by the information processing device.

(31) An information processing method performed by an information processing device, wherein the information processing device includes a data processing unit that controls a data reproduction process including switching of an information recording medium, the data processing unit calculates a root certificate transform value by applying a transform function corresponding to a version of the information recording medium to data constituting a root certificate recorded in the information recording medium, the data processing unit executes a comparison process for comparing a root certificate transform value based on a root certificate read from a preceding attachment information recording medium and a root certificate transform value based on a root certificate read from a subsequent attachment information recording medium, and based on a result of the comparison process, the data processing unit continues a process under execution when agreement between the two transform values is confirmed, and stops the process under execution or outputs a warning when disagreement between the two transform values is confirmed.

(32) A program under which an information processing device executes information processing, wherein the information processing device includes a data processing unit that controls a data reproduction process including switching of an information recording medium, under the program, the data processing unit executes a process for calculating a root certificate transform value by applying a transform function corresponding to a version of the information recording medium to data constituting a root certificate recorded in the information recording medium, and a process for executing a comparison process for comparing a root certificate transform value based on a root certificate read from a preceding attachment information recording medium, and a root certificate transform value based on a root certificate read from a subsequent attachment information recording medium, and based on a result of the comparison process, the data processing unit continues a process under execution when agreement between the two transform values is confirmed, and stops the process under execution or outputs a warning when disagreement between the two transform values is confirmed.

A series of processes described in the specification may be executed by hardware, software, or a complex configuration of hardware and software. For executing the processes by software, a program recording a processing sequence may be installed in a memory incorporated in dedicated hardware within a computer, or may be installed in a general-purpose computer capable of executing various types of processes. For example, the program may be recorded in a recording medium beforehand. The program may be installed into a computer from the recording medium, or received via a network, such as a LAN (Local Area Network) and the Internet, and installed in a recording medium such as a built-in hard disk.

The respective processes described in the specification are not only to be executed in time series described in the specification, but may be executed in parallel or individually in accordance with the processing capacity of the devices used for executing the processes, or as necessary. The system in the present specification refers to a logical collective configuration constituted by a plurality of devices, and includes a set of constituent devices not contained in an identical housing.

INDUSTRIAL APPLICABILITY

According to a configuration of an embodiment of the present disclosure, as described above, whether or not a correct continuous reproduction disk has been attached in a data reproduction process including disk switching is determined to realize a configuration capable of performing control in accordance with a determination result.

More specifically, a transform value is calculated based on data constituting a root certificate recorded in an information recording medium to execute a data reproduction process including switching of the information recording medium. For example, root certificate transform values are calculated by applying different transform functions in accordance with disk versions of a HD disk and a UHD disk. Transform values based on root certificates read from a preceding attachment disk and a subsequent attachment disk are compared. An application under execution is continued when the transform values match. However, the application under execution is stopped or a warning is output the transform values do not match.

This configuration is capable of determining whether or not a correct continuous reproduction disk has been attached, and performing control in accordance with a determination result in a data reproduction process including disk switching.

REFERENCE SIGNS LIST

10 Reproduction device
11 Reproduction device
12 Reproduction device
21 First disk
22 Second disk
31 First disk
32 Second disk
41 First disk
42 Second disk
51 First disk
52 Second disk
81 Content owner public key
82 Publisher (certificate authority) signature
91 First disk
92 Second disk
93 Disc-bound application
94 Disc-bound application
95 Disc-unbound application
101 Disk
102 Locate storage unit
121 Application program
131 Subsequent data search information
201 Root directory
202 BUDA root directory
203 Studio directory
204 Disk directory
201 Root directory
202 BUDA root directory
203 to 204 Studio & version directory
211 to 214 Disk directory
221, 222 Subsequent data
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An information processing device comprising,
   circuitry configured to
   control a data reproduction process for a first information recording medium and a second information recording medium,
   calculate a first root certificate transform value by applying a first transform function to data constituting a first root certificate recorded in the first information recording medium,
   calculate a second root certificate transform value by applying a second transform function to data constituting a second root certificate recorded in the second information recording medium,
   compare the first root certificate transform value and the second root certificate transform value, and
   based on a result of the comparison, continue a process under execution when the first and second root certificate transform values match, and stop the process under execution or output a warning when the first and second root certificate transform values do not match.

2. The information processing device according to claim 1, wherein, based on a result of the comparison, the circuitry is configured to continue execution of an application read from the first information recording medium when the first and second root certificate transform values match, and stop execution of the application or output a warning when the first and second root certificate transform values do not match.

3. The information processing device according to claim 2, wherein the circuitry is configured to read the application from the first information recording medium and store the application in the information processing device so that the application can be executed even after switching from the first information recording medium.

4. The information processing device according to claim 1, wherein
   the first and second root certificates are public key certificates associated with storage content of the first and second information recording mediums, and
   the transform function corresponds to a version of the first information recording medium.

5. The information processing device according to claim 1, wherein the root certificate is a public key certificate storing a public key of a content owner of the storage content of the information recording medium.

6. The information processing device according to claim 1, wherein
   the first and second information recording mediums are either an information recording medium of version 1 (V1) or an information recording medium of version 2 (V2) requiring different data processing in a reproduction process,
   the circuitry is further configured to
   execute a first directory name calculation process by applying a transform function f1 corresponding to version 1 to data constituting a root certificate recorded in the information recording medium (V1) when the information recording medium of version 1 (V1) is attached to the first information processing device, and
   execute a second directory name calculation process by applying a transform function f2 corresponding to version 2 to data constituting a root certificate recorded in the information recording medium (V2) when the information recording medium of version 2 (V2) is attached to the first information processing device.

7. The information processing device according to claim 6, wherein
the information recording medium of version 1 (V1) is an information recording medium storing high definition (HD) content, and
the information recording medium of version 2 (V2) is an information recording medium storing ultra high definition (UHD) content.

8. The information processing device according to claim 6, wherein
the transform function f1 corresponding to version 1 is a hash function h1, and
the transform function f2 corresponding to version 2 is a function f2=h1(h1) that repeats the hash function h1 twice.

9. The information processing device according to claim 6, wherein
the transform function f1 corresponding to version 1 is a hash function h1, and
the transform function f2 corresponding to version 2 is a hash function h2 different from the hash function h1.

10. The information processing device according to claim 6, wherein
the transform function f1 corresponding to version 1 is a hash function h1, and
the transform function f2 corresponding to version 2 is a hash function f2=h1∥h1 that calculates a connection value of calculation values of the hash function h1.

11. The information processing device according to claim 1, wherein the circuitry is further configured to
select data associated with the first information recording medium as reproduction target data stored in the information processing device,
execute a directory name calculation process by applying the transform function corresponding to the version of the information recording medium to the data constituting the root certificate recorded in the information recording medium, and
select data recorded in a directory having a calculated directory name as the reproduction target data.

12. The information processing device according to claim 11, wherein
the first and second information recording mediums are either an information recording medium of version 1 (V1) or an information recording medium of version 2 (V2) requiring different data processing in a reproduction process, and
the circuitry is further configured to
execute a directory name calculation process by applying a transform function f1 corresponding to version 1 to data constituting a root certificate recorded in the information recording medium (V1) when the information recording medium of version 1 (V1) is attached to the information processing device, and
execute a directory name calculation process by applying a transform function f2 corresponding to version 2 to data constituting a root certificate recorded in the information recording medium (V2) when the information recording medium of version 2 (V2) is attached to the information processing device.

13. A non-transitory computer-readable medium having embodied thereon content corresponding to a reproduction target of an information processing device, a root certificate corresponding to a public key certificate storing a public key of a content owner of the content, and an application executable by the information processing device, wherein the application is executable by the information processing device even after removal of the non-transitory computer-readable medium from the information processing device, and upon execution of the application the application causes the information processing device to perform a method, the method comprising:
controlling the information processing device to output a warning when a subsequent attachment of a different non-transitory computer-readable medium attached to the information processing device after removal of the non-transitory computer-readable medium is not a correct continuous subsequent attachment medium.

14. The non-transitory computer-readable medium according to claim 13, wherein
the information processing device calculates a root certificate transform value by applying a transform function corresponding to a version of the non-transitory computer-readable medium to data constituting the root certificate recorded in the non-transitory computer-readable medium,
the information processing device executes a comparison process for comparing the root certificate transform value based on the root certificate read from the non-transitory computer-readable medium and a root certificate transform value based on a root certificate read from the subsequent attachment of the different non-transitory computer-readable medium, and
the recorded application controls the information processing device to output a warning when the two root certificate transform values do not match.

15. An information processing method performed by an information processing device, the method comprising:
controlling a data reproduction process for a first information recording medium and a second information recording medium;
calculating a first root certificate transform value by applying a transform function to data constituting a first root certificate recorded in the first information recording medium;
calculating a second root certificate transform value by applying a transform function to data constituting a second root certificate recorded in the second information recording medium;
comparing the first root certificate transform value and the second root certificate transform value; and
based on a result of the comparison, continuing a process under execution when the first and second root certificate transform values match, and stopping the process under execution or outputting a warning when the first and second root certificate transform values do not match.

16. A non-transitory computer-readable storage medium having embodied thereon a program, which when executed by at least one processor of an information processing device causes the information processing device to execute an information processing method, the method comprising:
controlling a data reproduction process for a first information recording medium and a second information recording medium;
calculating a first root certificate transform value by applying a transform function to data constituting a first root certificate recorded in the first information recording medium;

calculating a second root certificate transform value by applying a transform function to data constituting a second root certificate recorded in the second information recording medium;
comparing the first root certificate transform value and the second root certificate transform value; and
based on a result of the comparison, continuing a process under execution when the first and second root certificate transform values match, and stopping the process under execution or outputting a warning when the first and second root certificate transform values do not match.

* * * * *